(12) United States Patent  (10) Patent No.: US 12,528,760 B2
Aramini et al.  (45) Date of Patent: Jan. 20, 2026

(54) CO-CRYSTAL OF KETOPROFEN AND ITS PREPARATION, PHARMACEUTICAL COMPOSITIONS COMPRISING THE SAME AND USES THEREOF

(71) Applicant: DOMPÉ FARMACEUTICI S.P.A., Milan (IT)

(72) Inventors: Andrea Aramini, L'Aquila (IT); Gianluca Bianchini, L'Aquila (IT); Samuele Lillini, Cardito (IT)

(73) Assignee: DOMPÉ FARMACEUTICI S.P.A., Milan (IT)

( * ) Notice: Subject to any disclaimer, the term of this patent is extended or adjusted under 35 U.S.C. 154(b) by 765 days.

(21) Appl. No.: 17/787,611

(22) PCT Filed: Dec. 21, 2020

(86) PCT No.: PCT/EP2020/087436
§ 371 (c)(1),
(2) Date: Jun. 21, 2022

(87) PCT Pub. No.: WO2021/130162
PCT Pub. Date: Jul. 1, 2021

(65) Prior Publication Data
US 2023/0002302 A1 Jan. 5, 2023

(30) Foreign Application Priority Data
Dec. 23, 2019 (EP) .................................. 19219293

(51) Int. Cl.
C07C 57/30 (2006.01)

(52) U.S. Cl.
CPC .......... C07C 57/30 (2013.01); *C07B 2200/13* (2013.01)

(58) Field of Classification Search
CPC ...... C07C 57/30; C07C 51/41; C07B 2200/13
See application file for complete search history.

(56) References Cited

U.S. PATENT DOCUMENTS

| 4,279,926 | A | 7/1981 | Bruzzese |
| 5,808,069 | A | 9/1998 | Bosone et al. |
| 12,285,396 | B2 * | 4/2025 | Aramini ............... A61K 31/192 |
| 2007/0292515 | A1 | 12/2007 | Schobel et al. |
| 2008/0311201 | A1 | 12/2008 | Der-Yang et al. |
| 2014/0031403 | A1 | 1/2014 | Gately et al. |

FOREIGN PATENT DOCUMENTS

| BE | 882889 | 8/1980 |
| CN | 1939893 | 4/2007 |
| CN | 103524365 | 1/2014 |

(Continued)

OTHER PUBLICATIONS

English translation of Professional Knowledge on Pharmaceutical Areas (I), China Medical Science Press, Jan. 2017, 11th edition, p. 95.

(Continued)

*Primary Examiner* — Deborah D Carr
(74) *Attorney, Agent, or Firm* — HUESCHEN AND SAGE

(57) ABSTRACT

The present invention refers to a co-crystal of Ketoprofen Lysine named Form 4, a pharmaceutical composition comprising said co-crystal, a process for its preparation and to its use in the treatment of pain and inflammatory diseases.

22 Claims, 14 Drawing Sheets

(56) References Cited

FOREIGN PATENT DOCUMENTS

| | | |
|---|---|---|
| CN | 104987287 | 10/2015 |
| EA | 000599 | 12/1999 |
| GB | 1497044 | 1/1978 |
| IT | TO20120978 | 5/2014 |
| JP | S59190912 | 10/1984 |
| RU | 2340334 | 1/2006 |
| RU | 2437657 | 12/2011 |
| RU | 2599717 | 10/2016 |
| WO | WO 97/24114 | 7/1997 |
| WO | WO 2004/037242 | 5/2004 |
| WO | WO 2008/077813 | 7/2008 |
| WO | WO 2010/043412 | 4/2010 |
| WO | WO 2011/132167 | 10/2011 |
| WO | WO 2012/071517 | 5/2012 |

OTHER PUBLICATIONS

Professional Knowledge on Pharmaceutical Areas (I), China Medical Science Press, Jan. 2017, 11th edition, p. 95.
Aitipamula, et al., Crystal Growth & Design 2012, 12, 2147-2152.
Almarsson, et al., Chem. Commun., 2004, 1889-1896.
Chen, et al., Crystengcomm, 12, 2010, 1485-1493.
International Search Report for PCT/EP2019/025464 dated Mar. 30, 2020.
Kuminek, et al., Advanced Drug Delivery Reviews, Apr. 29, 2016, vol. 101, 143-166.
Selleckchem, "L-lysine". https://www.selleckchem.com/datasheet/l-lysine-S563001-DataSheet.html, 2024.
Sigma, "L-Lysine Product Information".https://www.sigmaaldrich.com/deepweb/assets/sigmaaldrich/product/documents/334/572/15501pis.pdF, 2024.
Texas Natural Supply, "L-Lysine Powder" https://www.texasnaturalsupply.com/L-Lysine-Powder-p/llsp-nt.htm, 2024.
Caira, Topics in Current Chemistry, 1998, 198, 164-208.
Duggirala, et al., Chem. Commun., 2016, 52, 640-655.
Kümmerer, Annu. Rev. Environ. Resour., 2010, 35, 57-75.
Panerai, et al., Trends in Medicine, 2012, 12, 159-167.
Rodríguez-Spong, et al., Advanced Drug Delivery Reviews, 2004, 56, 241-274.
Sarma, et al., Korean J. Chem. Eng., 2011, 28, 315-322.
Variankaval, et al., AIChE, 2008, 54, 1682-1688.
Yadav, et al., Indian Journal of Pharmaceutical Sciences, 2009, Jul.-Aug., 359-370.
English translation of BE8882889.
International Search Report PCT/ep2020/087436 dated Apr. 1, 2021.

\* cited by examiner (1A)

(1B)

CO-CRYSTAL OF KETOPROFEN AND ITS PREPARATION, PHARMACEUTICAL COMPOSITIONS COMPRISING THE SAME AND USES THEREOF

FIELD OF THE INVENTION

The present invention refers to a co-crystal of Ketoprofen Lysine named Form 4, to a process for its preparation, to a pharmaceutical composition comprising said co-crystal and to their medical use, in particular to their use in the treatment of pain and inflammatory diseases.

BACKGROUND OF THE INVENTION

Ketoprofen, ((RS)-2-(3-benzoylphenyl)-propionic acid, chemical formula $C_{16}H_{14}O_3$) of formula

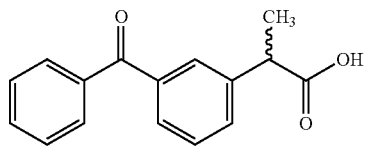 [SMILES: CC(C(=O)O)c1cccc(C(=O)c2ccccc2)c1]

is one of the propionic acid class of nonsteroidal anti-inflammatory drugs (NSAID) with analgesic and antipyretic effects.

Because of its high tolerability, Ketoprofen is one of the non-steroidal anti-inflammatory drugs of widespread use in clinics, both for the treatment of serious inflammatory conditions and for its use in analgesic and antipyretic by inhibiting the body's production of prostaglandin.

Pharmaceutical compositions of current use containing Ketoprofen have a racemate as its active ingredient, where the two enantiomers S(+) and R(−) are present in equimolecular ratio.

The active ingredient is normally used as free acid, practically insoluble in water, in pharmaceutical compositions destined for oral use, while for alternative ways of administration, suitable Ketoprofen salts with organic and inorganic bases, such as for instance, Ketoprofen Sodium, or aminoacids, such as Ketoprofen Lysine Salt, have been used.

The salts of Ketoprofen are usefully employed in the treatment of those pathological symptoms of rheumatoid and chronic type, which require the drug to be administered at high dosage, continuously and for long time. It is important and desirable that for the treatment of acute and very painful manifestations there are pharmaceutical compositions suitable for immediate and manageable use, which rapidly release the active ingredient and are of high bio-availability. Typical examples of these compositions are those by parenteral administration and/or by oral administration, which allow a fine dispersion of the active ingredient.

The solubility and dissolution rate of drugs are decisive factors after oral administration for rate and extent of absorption.

These factors represent a key challenge for the development and formulation of effective drug in the pharmaceutical industry. The issue of poor drugs solubility—which is troublesome for synthesis and development as well—is known and is responsible for bioavailability problems.

Various strategies have been well documented to enhance solubility and dissolution of poorly soluble drugs such as salt formation, solid dispersion, microemulsion, co-solvency, inclusion complex formation with cyclodextrin etc.

It is also possible to achieve desired properties of a particular active pharmaceutical ingredient (API) by forming a co-crystal of the API itself, or of a salt of the API. Pharmaceutical co-crystallization has attracted great amount of academic, industrial and therapeutic interests by co-crystallization of two or amore pure compounds with crystal engineering to create a new functional material.

Co-crystals can be defined as a stoichiometric multi-component system formed between two or more compounds, which are solid under ambient conditions, connected by non-covalent and non-ionic interactions.

Pharmaceutical co-crystals are non-ionic supramolecular complexes and can be used to improve physicochemical property issues such as solubility, stability and bioavailability in pharmaceutical development without changing the chemical composition of the API.

Co-crystals containing API can be used to deliver API therapeutically. New drug formulations comprising co-crystals of API with pharmaceutically acceptable co-formers may, in some cases, have superior properties over existing drug formulations. However, co-crystal formation is not predictable and, in fact, not always possible. Moreover, there is no way to predict the properties of a particular co-crystal of a compound until it is formed. As such, finding the right conditions to obtain a particular co-crystal of a compound, with pharmaceutically acceptable properties, can take significant time, effort, and resources.

The documents GB1497044A and BE882889 describe the preparation of salts of Ketoprofen with Lysine of formula

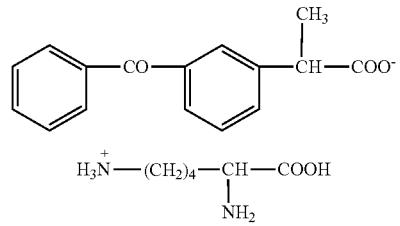

with a process in which non-saturated solutions of the components are used.

However, the known Ketoprofen Lysine Salt shows low crystallinity and rather high particle size, as shown herein in FIG. 12 and at Table 11. These properties of Ketoprofen Lysine Salt may not be ideal in terms of hygroscopicity and flowability of the powder or of dissolution profile and possibly in vivo bioavailability.

The European Patent Application n. EP18215336.1, filed on Dec. 21, 2018, describes the preparation and the characterization of a co-crystal of Ketoprofen Lysine, named Form 1.

SUMMARY OF THE INVENTION

The Applicant has unexpectedly found that Ketoprofen and Lysine, under certain process conditions, can form a co-crystal (herein named Form 4) which is characterized by higher crystallinity, lower particle size and better taste than previous Ketoprofen Lysine Salt. Additionally, Ketoprofen Lysine co-crystal Form 4 shows a higher dissolution rate when compared to Ketoprofen Lysine co-crystal Form 1.

Thus a first object of the present invention refers to a co-crystal of Ketoprofen Lysine (Form 4) characterized by having an X ray diffraction pattern with characteristic peaks at 13.6; 16.0; 16.5; 17.3; 19.1; 19.4; 20.5; 21.8; 22.9; 23.5;

24.9; 25.9; 27.6° 2theta, with a margin of error on the value indicated for each peak of ±0.20 degrees (2 theta).

Another object of the present invention is a pharmaceutical composition comprising the co-crystal of Ketoprofen Lysine (Form 4) of the present invention and at least a physiologically acceptable excipient.

Another object of the present invention is a pharmaceutical composition comprising the co-crystal of Ketoprofen Lysine (Form 4) of the present invention in combination with at least another pharmaceutically active ingredient.

Another object of the present invention refers to the co-crystal of Ketoprofen Lysine (Form 4) and to the pharmaceutical composition comprising said co-crystal for use as a medicament.

Another object of the present invention refers to the co-crystal of Ketoprofen Lysine (Form 4) and to the pharmaceutical composition comprising said co-crystal for the use in the treatment of pain and inflammatory diseases.

Another object of the present invention is a process for the preparation of the co-crystal of the present invention, wherein said process comprises the following steps:
a) preparing a non-saturated solution of Ketoprofen in a solvent selected from 2-methyl-1-propanol and ethyl acetate;
b) mixing the non-saturated solution of Ketoprofen with solid lysine to provide an admixture.

Figure 1:
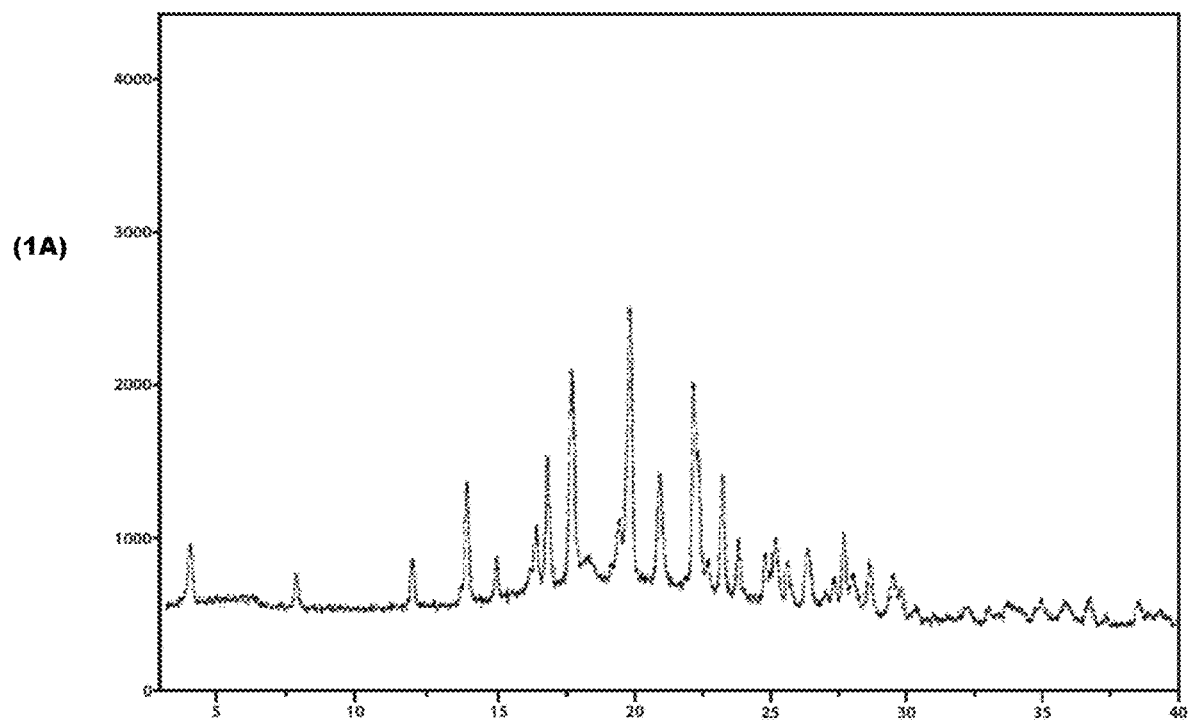
FIG. 1. XRPD spectra of Ketoprofen Lysine co-crystal Form 1 (1A) and Ketoprofen Lysine Salt (1B).
Figure 1:
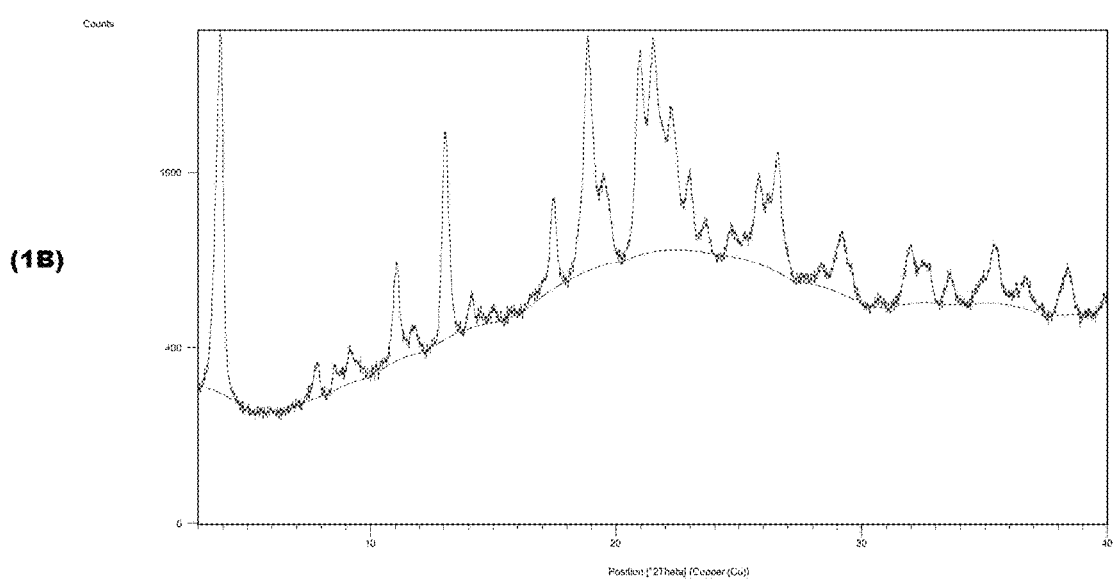

Keys: KL1 Ketoprofen Lysine co-crystal Form 1; KL4 Ketoprofen Lysine co-crystal Form 4; KLS Ketoprofen Lysine Salt; KET Ketoprofen; LYS Lysine

DETAILED DESCRIPTION OF THE INVENTION

Definitions

Unless otherwise defined, all terms of art, notations and other scientific terminology used herein are intended to have the meanings commonly understood by those of skill in the art to which this disclosure pertains. In some cases, terms with commonly understood meanings are defined herein for clarity and/or for ready reference; thus, the inclusion of such definitions herein should not be construed to represent a substantial difference over what is generally understood in the art.

The term "physiologically acceptable excipient" herein refers to a substance devoid of any pharmacological effect of its own and which does not produce adverse reactions when administered to a mammal, preferably a human. Physiologically acceptable excipients are well known in the art and are disclosed, for instance in the Handbook of Pharmaceutical Excipients, sixth edition 2009, herein incorporated by reference.

For the purpose of the present invention, the expression "room temperature" means a temperature range of 18 to 25° C.

For the purpose of the present invention the expression "co-crystal" means a stoichiometric multi-component system, in which the components are connected by non-covalent, non-ionic interactions and, individually, are solid under room conditions.

For the purpose of the present invention, the expression "pain" means pain caused by disturbances of different nature and origin, such as, for example: headache or cephalalgy: both primary and therefore not related to other factors or diseases, and secondary and therefore dependent on trauma, injury and distinct diseases; toothache: in case of abscesses or caries that create pain in the dental pulp, with numerous blood vessels and nerves; menstrual pains: abdominal and lower abdominal pain and headaches caused by hormonal changes typical of the period of menstruation; neuralgia, or intense nerve pain due to strains, trauma and infections; pain in the muscles, or myalgia: pains located at the level of muscles when using or touching them, due to sudden contractions or traumas; osteoarticular pains, such as joint inflammations (to the bones, cartilages, ligaments and tendons) following traumas, old age, strains and injuries.

The terms "approximately" and "about" herein refers to the range of the experimental error, which may occur in a measurement.

The term "saturated solution" is to be construed as a chemical solution containing the maximum concentration of a solute dissolved in the solvent at a certain temperature. In the present context, if not otherwise stated, reference is made to room temperature.

The term "non-saturated solution" is to be construed as a chemical solution containing a concentration of a solute dissolved in the solvent at a certain temperature which is lower than the maximum concentration of the solute dissolved in that solvent at the same temperature. In the present context, if not otherwise stated, reference is made to room temperature.

A first object of the present invention refers to a co-crystal of Ketoprofen Lysine (Form 4) characterized by an X ray diffraction pattern with characteristic peaks at 13.6; 16.0;

16.5; 17.3; 19.1; 19.4; 20.5; 21.8; 22.9; 23.5; 24.9; 25.9; 27.6° 2theta, with a margin of error on the value indicated for each peak of ±0.20 degrees (2 theta).

In FIG. 1 XRPD patterns of previous Ketoprofen Lysine co-crystal Form 1 (1A) and Ketoprofen Lysine Salt (1B) are shown.

Figure 2:
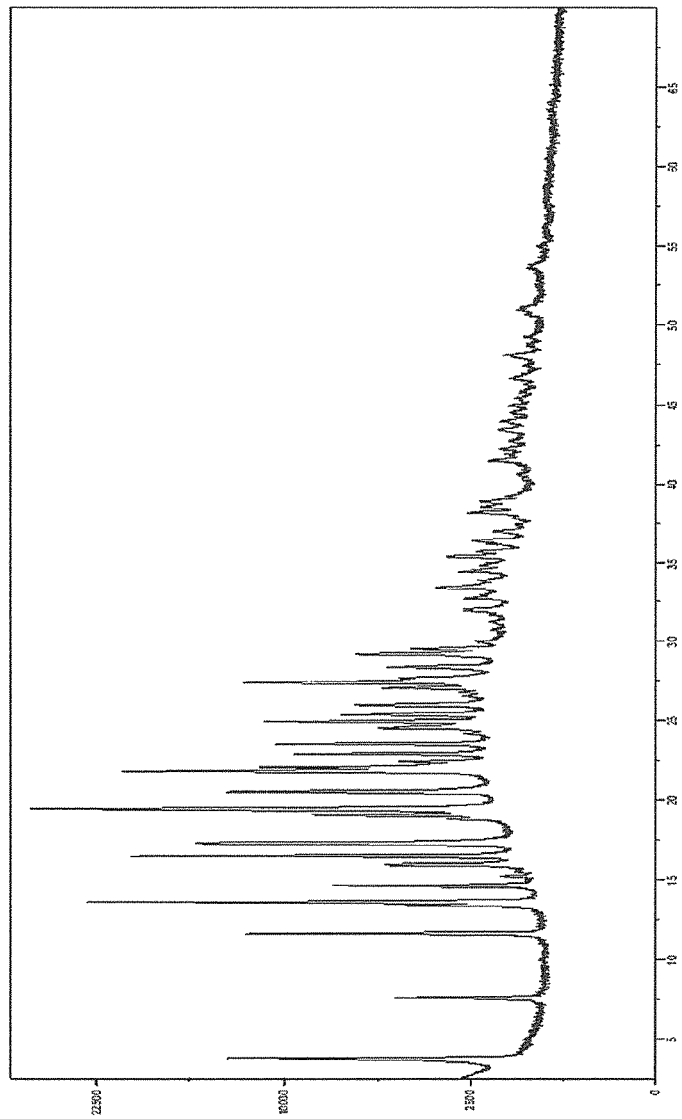
FIG. 2. XRPD spectrum of Ketoprofen Lysine co-crystal Form 4 prepared according to Example 1.

The typical XRPD pattern of Ketoprofen Lysine co-crystal Form 4 is represented in FIG. 2.

The Ketoprofen Lysine co-crystal Form 4 of the present invention is a polymorph of Ketoprofen Lysine co-crystal Form 1, as demonstrated by XRPD (Table 2) and ss-NMR (Table 7) analysis.

Figure 3:
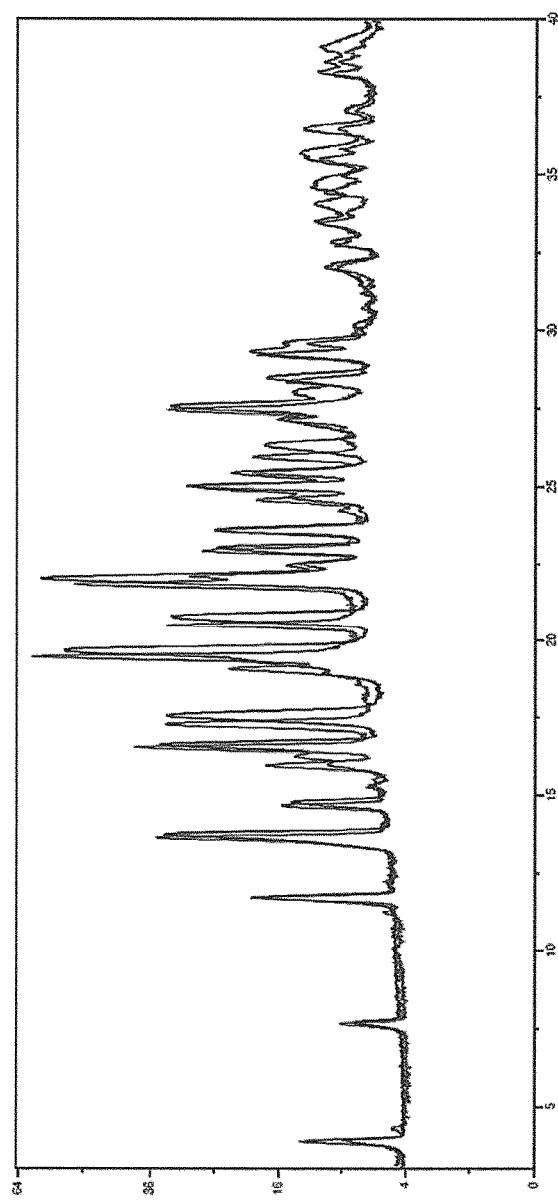
FIG. 3. XRPD spectra of Ketoprofen Lysine co-crystal Form 4 compared to Ketoprofen Lysine co-crystal Form 1.

The comparison of the XRDP patterns of Ketoprofen Lysine co-crystal Form 4 of the present invention and Ketoprofen Lysine co-crystal Form 1 is shown in FIG. 3 and Table 2.

As reported in Table 2, the XRPD diffractogram shows relevant differences between the two polymorphs Form 1 and Form 4 of Ketoprofen Lysine co-crystal in the region from 15 to 28° 2theta, with the peaks showing a shift ≥0.2 degrees at 15.5; 16.0; 17.3, 19.2; 19.3; 19.4; 21.7; 24.5; 24.7; 25.9; 26.0; 26.5° 2theta and the peaks with a shift of 0.3 degrees at 25.9 vs 26.2, 26.5 vs 26.8, 26.5 vs 26.8 2theta.

Figure 4:
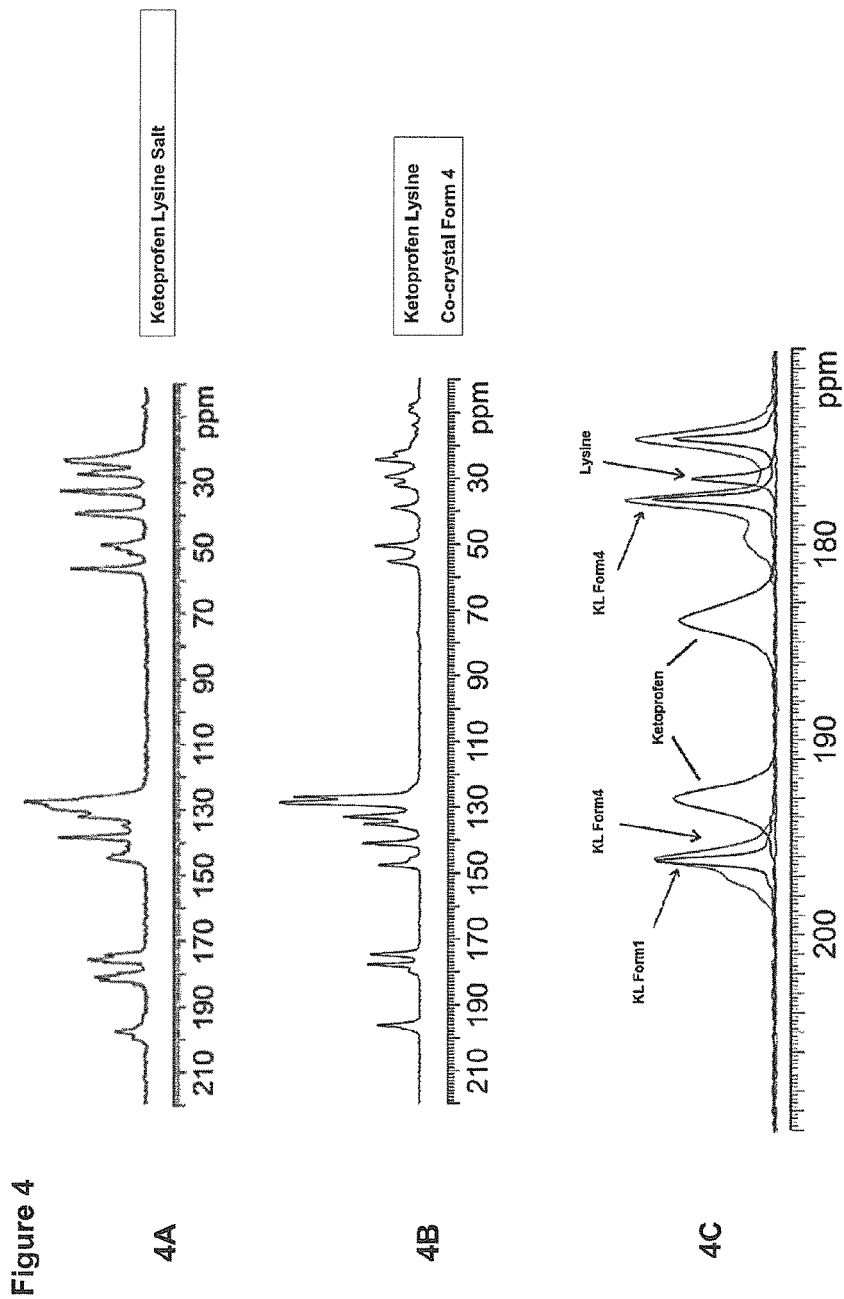
FIG. 4. $^{13}$C (100 MHz) CPMAS solid-state NMR spectra of Ketoprofen Lysine Salt (4A), Ketoprofen Lysine co-crystal Form 4 (4B) and, overlapped, of Ketoprofen Lysine co-crystal Form 1, Ketoprofen Lysine co-crystal Form 4, Ketoprofen and Lysine (details of the carboxylic region) (4C).
Figure 5:
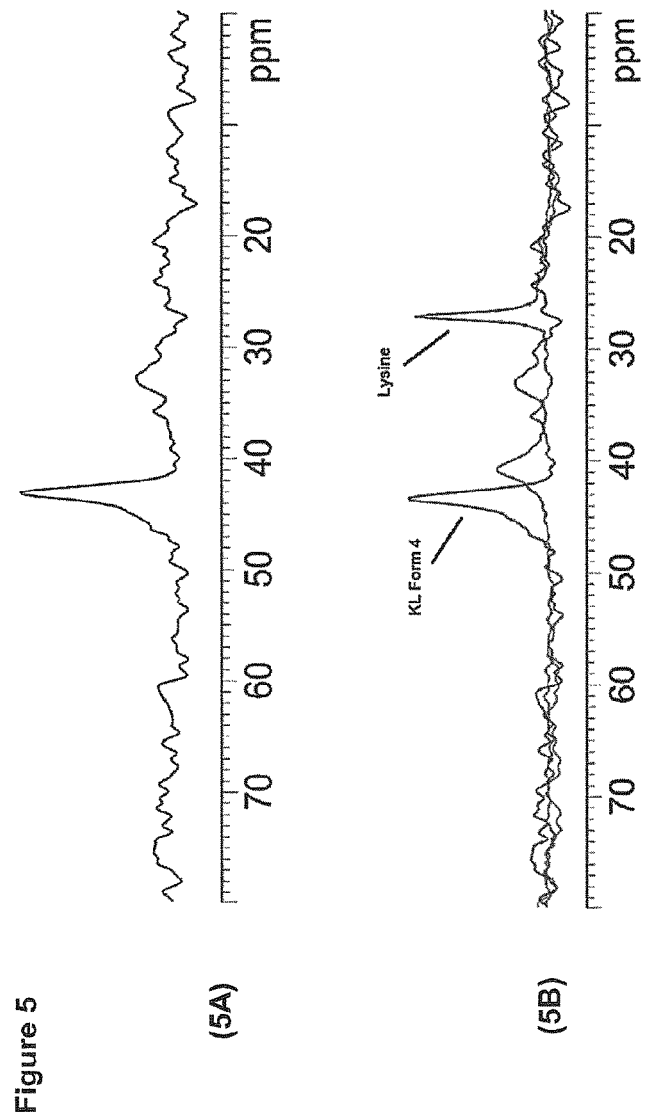
FIG. 5. $^{15}$N (40.56 MHz) CPMAS solid-state NMR spectra of Ketoprofen Lysine co-crystal Form 4 (5A) and in admixture with Lysine (5B).

In addition, the co-crystalline nature of Ketoprofen Lysine co-crystal Form 4 of the present invention is shown in the $^{13}C$ (100 MHz) and $^{15}N$ (40.56 MHz) CPMAS solid-state NMR spectra, as depicted in FIGS. 4, 5 and in Table 7.

Figure 14:
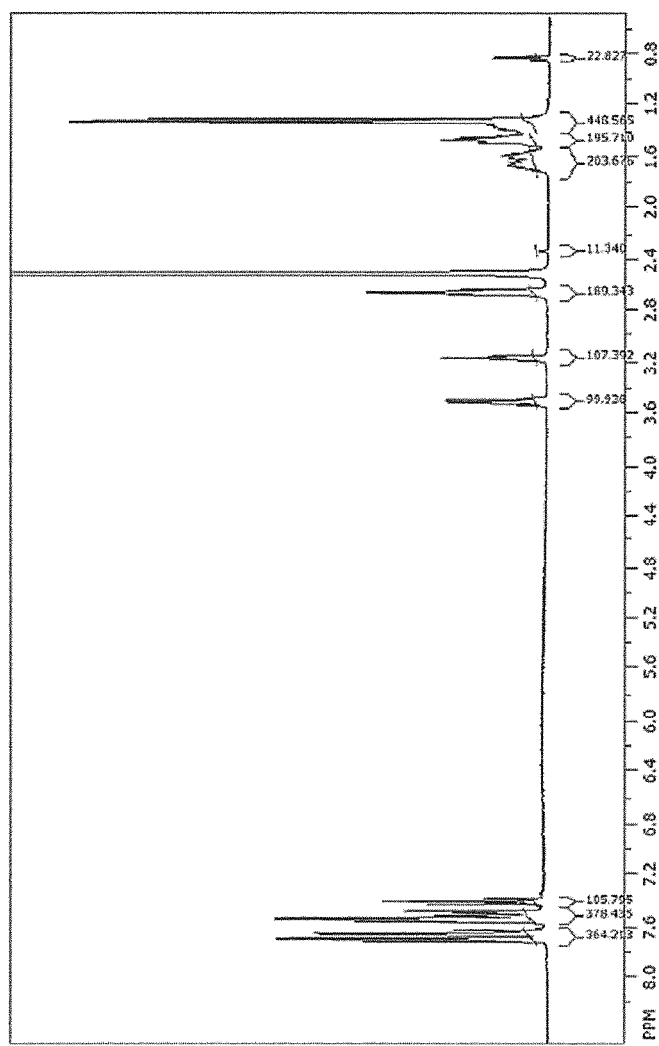
FIG. 14. 1H-NMR spectrum of Ketoprofen Lysine co-crystal Form 4 (onset T 100.53° C.).

The Ketoprofen Lysine co-crystal Form 4 of the present invention is further characterized by TGA (FIG. 9B), DSC (FIG. 10A), FT-IR (FIG. 6 and Table 4), FT-Raman (FIG. 8 and Table 5), and liquid 1H-NMR spectra (FIG. 14).

Preferably, the molecular ratio between Ketoprofen and Lysine of the co-crystal Form 4 of the present invention is 1:1.

Preferably, the co-crystal of the present invention is co-crystal of (R)-2-(3-benzoylphenyl)-propionic acid D-Lysine.

Preferably, the co-crystal of the present invention is co-crystal of (R)-2-(3-benzoylphenyl)-propionic acid L-Lysine.

Preferably, the co-crystal of the present invention is co-crystal of (S)-2-(3-benzoylphenyl)-propionic acid D-Lysine.

Preferably, the co-crystal of the present invention is co-crystal of (S)-2-(3-benzoylphenyl)-propionic acid L-Lysine.

Advantageously, Ketoprofen Lysine co-crystal Form 4 of the present invention shows a high dissolution rate, higher than the dissolution rate of Ketoprofen Lysine co-crystal Form 1 (Table 10).

Thus, the high dissolution rate of Ketoprofen Lysine co-crystal Form 4 of the present invention is predictive of an advantageous use in the treatment of those pathological and chronic symptoms, which require the drug to be administered at high dosage, continuously and for long time.

Figure 11:
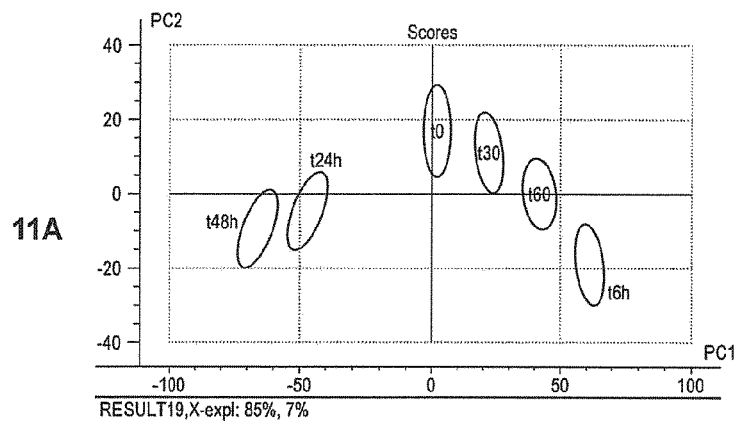
FIG. 11. Principal Component Analysis (PCA) score plot of Ketoprofen Lysine co-crystal Form 4 (variation over time) (11A), of Ketoprofen Lysine co-crystal Form 1 (variation over time) (11B) and Partial Least Discriminant Analysis (PLS-DA) score plot of Ketoprofen Lysine co-crystal Form 1 and Ketoprofen Lysine co-crystal Form 4 (11C).
Figure 11:
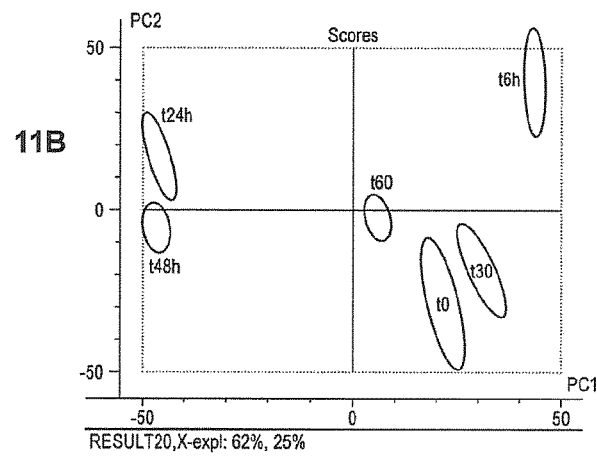
Figure 11:
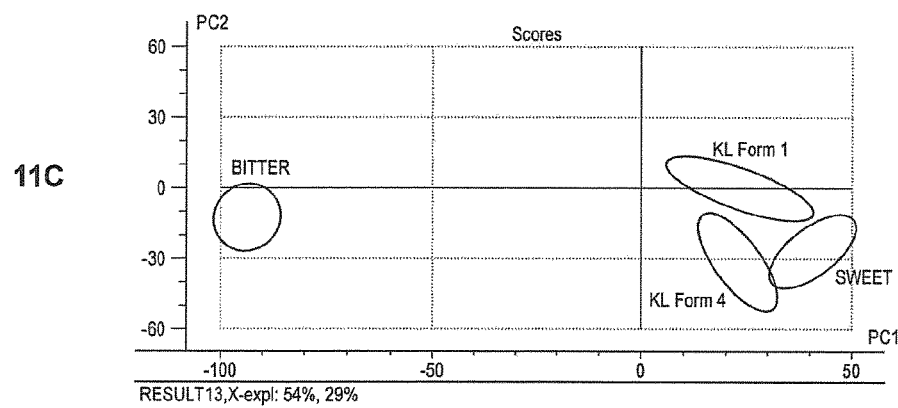

Furthermore, Ketoprofen Lysine co-crystal Form 4 of the present invention is characterized by a better taste if compared with Ketoprofen Lysine co-crystal Form 1 of the present invention as resulted in the Electronic Tongue test (see Experimental part par. 8 and FIG. 11).

Another object of the present invention refers to pharmaceutical compositions comprising the co-crystal of Ketoprofen Lysine Form 4 of the present invention and at least one physiologically acceptable excipient.

The pharmaceutical composition of the present invention is preferably suitable for immediate and handy use, and rapidly releases the API.

Preferably, said excipients are selected from the group consisting of: povidone, colloidal silica, hydroxypropylmethylcellulose, eudragit EPO, sodium dodecyl sulfate, stearic acid, magnesium stearate, aspartame, mannitol, xylitol, talc, flavors.

Preferably, the pharmaceutical composition of the present invention is in a solid form, more preferably in solid granulate form.

Another object of the present invention is the co-crystal of Ketoprofen Lysine Form 4 and the pharmaceutical composition comprising said co-crystal for medical use, preferably for use in the treatment of pain and inflammation diseases.

Preferably, the co-crystal of Ketoprofen Lysine Form 4 and the pharmaceutical composition comprising said co-crystal are used in the treatment of pain, in which the pain is selected from the group consisting of: acute pain, headache, toothache, menstrual pain, muscle pain, osteoarticular pain.

Preferably, the co-crystal of Ketoprofen Lysine Form 4 and the pharmaceutical composition comprising said co-crystal are used in the treatment of inflammation diseases, in which the inflammation diseases are selected from the group consisting of rheumatic diseases.

Another object of the present invention is a pharmaceutical composition comprising the co-crystal of Ketoprofen Lysine (Form 4) of the present invention in combination with one or more pharmaceutically active ingredients.

Another object of the present invention is a process for the preparation of the co-crystal of the present invention, wherein said process comprises the following steps:
  a) preparing a non-saturated solution of Ketoprofen in a solvent selected from 2-methyl-1-propanol and ethyl acetate;
  b) mixing the non-saturated solution of Ketoprofen with solid lysine to provide an admixture.

The present process is characterized by one or more of the following features, taken alone or in combinations.

Preferably, the solvent of step a) is 2-methyl-1-propanol.

Preferably, the non-saturated solution of step a) has a concentration of Ketoprofen lower than 350 mg/ml, more preferably lower than 200 mg/ml, even more preferably lower than 100 mg/ml.

Preferably, the non-saturated solution of Ketoprofen of step a) has a concentration of Ketoprofen from 50 to 150 mg/ml, more preferably from 70 to 120 mg/m, even more preferably from 80 to 100 mg/ml.

Preferably, the non-saturated solution of Ketoprofen of step a) has a concentration of Ketoprofen lower than 200 mg/ml, preferably lower than 150 mg/ml, more preferably lower than 100 mg/ml.

Preferably, in step b) of the present process, solid lysine is mixed with the non-saturated solution of step a) by direct addition of the solid powder to the solution, preferably under stirring, to provide the admixture.

In alternative, the solution of step a) can be added to solid lysine, preferably under stirring, to provide the admixture.

In alternative, solid lysine can be in form of a suspension in a suitable anti-solvent, namely in a solvent in which Lysine has a low solubility such as for instance Ethyl Acetate, Ethanol, Methanol, 2-Methyl-1-propanol, or their admixtures, preferably in 2-methyl-1-propanol. In this case, the anti-solvent is preferably used in a volume to weight ratio from 10 to 70 ml/g, more preferably from 30 to 50 ml/g of Lysine.

An indicative value of low solubility is for instance the solubility of Lysine in 2-Methyl-1-propanol, which is about 0.026 g/ml.

Preferably, the admixture obtained at step b) is stirred for 1 to 80 hours, more preferably from 3 to 70 hours, even more preferably from 5 to 60 hours.

Preferably, the admixture obtained at step b) is stirred at a temperature from 5° C. to 70° C., more preferably from 25° C. to 60° C., even more preferably from 50° C. to 60° C.

Preferably, the admixture obtained at step b) has a water content from 0.3 to 1.5% (v/v), more preferably from 0.8% to 1.1% (v/v).

Preferably, in the present process, the molar ratio Ketoprofen:Lysine is from 1.5:1 to 3.5:1, more preferably from 2:1 to 3:1.

Preferably, the admixture obtained at step b), after having been stirred for a suitable time and at a certain temperature, is cooled down at a temperature from −5° C. to 60° C., more preferably from 10° C. to 50° C., even more preferably to room temperature.

In a preferred embodiment of the present process, the non-saturated solution of Ketoprofen in 2-methyl-1-propanol of step a) has a concentration of Ketoprofen from 80 to 100 mg/ml and in a molar ratio Ketoprofen/Lysine from 2:1 to 3:1. In step b) solid lysine is mixed with the non-saturated solution of step a) by direct addition of the solid powder to the solution. The admixture obtained at step b) is stirred for 5 to 60 hours at a temperature from 50° C. to 60° C. and then cooled down at room temperature.

Advantageously, the present process provides for Ketoprofen Lysine co-crystal Form 4 of the present invention in high yield as reported in Table 1.

EXPERIMENTAL PART

In the following, some-non limitative-examples are provided related to the preparation process of the co-crystal of Ketoprofen Lysine Form 4, its yields, and it characterization by XRPD analysis, DSC/TGA analysis, NMR analyses, FT-IR analysis, RAMAN analysis, particle size distribution analysis, dissolution rate test, and taste assessment by electronic tongue.

1. Preparation of Ketoprofen Lysine Compounds

Example 1

Preparation of Ketoprofen Lysine Co-Crystal Form 4

Ketoprofen free add (1.9 g, 7.5 mmol) was dissolved in 20 mL of 2-methyl-1-propanol (MPR) and left to stir at room temperature up to dissolution. Then solid Lysine (0.55 g, 3.75 mmol) was added and the resulting mixture was heated at 50° C. for 3 hours. The mixture was then cooled at 5° C. and filtered. A washing with MPR (6 mL×2) was performed to recover the powder from the reactor's wall. The filtered cake was then washed with mother liquor under vacuum. The filtered cake was dried into the drying oven at 60° C. and 50 mbar vacuum for 16 hours. The compound was obtained as a white powder in 63% yield.

The compound was characterized by XRPD, TGA, DSC, FT-IR, FT-Raman, liquid state 1H-NMR (see sections below).

Example 2

Preparation of Ketoprofen Lysine Co-Crystal for 4 (Scale Up)

The process of Example 1 was repeated starting from 188 g of Ketoprofen.

The main process parameters were studied according to the conditions and with results collected in the following Table 1:

TABLE 1

| Ex. n | Mol. ratio KET/ LYS | Conc. KET mg/ml | Water cont. (% v/v) | Heating T step b) | Stirring time (h) | Cooling T (° C.) | Product | Yield % w/w |
|---|---|---|---|---|---|---|---|---|
| 2A | 3/1 | 87 | 0.3 | 60 | 24 | 25 | Form 4 | 80.9 |
| 2B | 3/1 | 87 | 1 | 60 | 24 | 25 | Form 4 | 89.7 |
| 2C | 1.5/1 | 87 | 1 | 60 | 5 | 25 | Form 4 | 84.4 |
| 2D | 2/1 | 87 | 1 | 60 | 24 | 25 | Form 4 | 88.0 |

Example 3

Preparation of Ketoprofen Lysine Form 1 (Comparison)

650 mg of racemic Lysine were suspended in 0.5 mL of water, then the suspension was filtered and added to 87 mg (0.34 mmol) of Ketoprofen. The mixture was so stirred for 24 hours at room temperature; after this time, no solid was recovered, so the solution was left to evaporate at high temperature until the formation of a sticky solid was observed. In order to get a solid suitable for XRPD analysis, the sticky solid was slurried in Isopropyl Ether (IPE) for 24 hours providing after filtration Ketoprofen Lysine co-crystal Form 1.

The XRDP spectra of Ketoprofen Lysine co-crystal Form 1 is shown in FIG. 1A.

Example 4

Preparation of Ketoprofen Lysine Salt (Comparison)

Ketoprofen 0.76 g and racemic Lysine 0.44 g (eq. ratio 1:1) were stirred in 20 mL of methanol at 40° C. for 1 hour. Ketoprofen was dissolved while the suspended Lysine was filtered off (filter 0.45 um) directly in a Mettler Toledo Easymax 102 reactor. The solution was left under stirring for 5 minutes in the reactor, then 100 mL of ethyl acetate was added and the solution was cooled down to −5° C. without solid formation. Additional ethyl acetate (20 mL) was added through pipette in two aliquots (10 mL and 10 mL) to trigger the nucleation. The system was left under stirring until the suspension became milky. Additional 30 minutes of stirring was applied. The precipitate was then filtered and characterized by XRPD (FIG. 1B).

2. XRPD Analysis

| The XRPD analysis has been carried out with an instrument having the following characteristics: instrument type: Rigaku MiniFlex600 | |
|---|---|
| Application SW: | Miniflex Guidance |
| Measurement Details | |
| Measurement type: | Single scan |
| Sample mode: | Reflection |
| Scan | |
| Scan range: | 3.000-40.000° (2θ) |
| Step size: | 0.01° (2θ) |
| Speed: | 10.0°/min (2θ) |
| Scan mode: | Continuous |

The XRPD analysis has been carried out with an instrument having the following characteristics: instrument type: Rigaku MiniFlex600

| Used wavelength | |
|---|---|
| Intended wavelength type: | Kα1 |
| Kα1: | 1.540598 Å |
| Kα2: | 1.544426 Å |
| Kα2/Kα1 intensity ratio: | 0.50 |
| Kα: | 1.541874 Å |
| Kα: | 1.392250 Å |
| Instrument Details | |
| X-Ray Generator | |
| Tube output voltage: | 40 kV |
| Tube output: | 15 mA |
| High-voltage generation method: | High-frequency Cockcroft-Walton method |
| Stability: | Within ±0.05% for both the tube voltage and tube current, with reference to ±10% of input power variation. |
| X-ray tube | |
| Name: | Toshiba Analix type A-26L |
| Anode material: | Cu |
| Maximus output: | 0.60 kW |
| Focus size: | 1 × 10 mm |
| Kβ Filter | |
| Name: | Ni-filter |
| Thickness (mm): | 0.015 |
| Material: | Ni |
| Goniometer (Angle measuring device) | |
| Type: | Vertical θ/2θ |
| Goniometer radius: | 150 mm |

The XRPD analysis has been carried out with an instrument having the following characteristics: instrument type: Rigaku MiniFlex600

| | |
|---|---|
| Scanning axis: | θ/2θ linked |
| 2θ scanning range: | +2° to +140° |
| θ/2θ axis minimum step angle: | 0.005° (2θ) |
| Position speed: | 500°/min (2θ) |
| Scanning speed: | 0.01 to 100°/min |
| Datum angle: | 2θ = 10° |
| X-ray take-off angle: | 6° (fixed) |
| Slit | |
| DS: | 1.25° |
| IHS: | 10.0 mm |
| SS: | none (open) |
| RS: | none (open) |
| Incident side Seller slit: | 2.5° |
| Receiving side Seller slit: | 2.5° |
| Detector | |
| Name: | D/teX Ultra High-speed 1D Detector |

A sample of Ketoprofen Lysine co-crystal Form 4 obtained with the process of Example 1 has been analysed by XRPD (FIG. 2).

In FIG. 3, XRPD spectra of Ketoprofen Lysine co-crystal Form 4 and of Ketoprofen Lysine Form 1 are shown.

The characteristic peaks of the XRPD spectrum of Ketoprofen Lysine co-crystal Form 4 according to the invention is reported in Table 2 with the pattern profile of Ketoprofen Lysine Form 1 for comparison.

The position and assigned hkl plane and intensity of the peaks of the two polymorphs are also reported in Table 2.

TABLE 2

Peak List of Ketoprofen Lysine co-crystal Form 4 and Form 1

| Form 4 | | | | | | Form 1 | | | | | |
|---|---|---|---|---|---|---|---|---|---|---|---|
| h | k | l | d(Å) | 2θ(deg) | Intensity | h | k | l | d(Å) | 2θ(deg) | Intensity |
| 1 | 0 | 0 | 23.29 | 3.8 | 1592.1 | 1 | 0 | 0 | 23.2 | 3.8 | 1089.118 |
| 2 | 0 | 0 | 11.64 | 7.6 | 454.5 | 2 | 0 | 0 | 11.6 | 7.6 | 374.466 |
| 3 | 0 | 0 | 7.76 | 11.4 | 9.59 | 3 | 0 | 0 | 7.7 | 11.4 | 8.7 |
| 1 | 1 | 0 | 7.60 | 11.6 | 1212.2 | 1 | 1 | 0 | 7.6 | 11.6 | 1043.356 |
| 2 | 1 | 0 | 6.61 | 13.4 | 351.2 | 2 | 1 | 0 | 6.6 | 13.4 | 339.4742 |
| 0 | 1 | 1 | 6.51 | 13.6 | 1554.2 | 0 | 1 | 1 | 6.5 | 13.6 | 552.2654 |
| 1 | −1 | −1 | 6.50 | 13.6 | 921.8 | 1 | −1 | −1 | 6.5 | 13.6 | 1718.124 |
| 1 | 1 | 1 | 6.06 | 14.6 | 577.1 | 1 | 1 | 1 | 6.0 | 14.6 | 125.3324 |
| 2 | −1 | −1 | 6.05 | 14.6 | 181.4 | 2 | −1 | −1 | 6.0 | 14.7 | 614.0069 |
| 4 | 0 | 0 | 5.82 | 15.2 | 49.1 | 4 | 0 | 0 | 5.8 | 15.2 | 57.78102 |
| 1 | 0 | −2 | 5.71 | 15.5 | 7.63710 | 1 | 0 | −2 | 5.6 | 15.7 | 15.81796 |
| 3 | 1 | 0 | 5.58 | 15.9 | 406.6 | 3 | 1 | 0 | 5.6 | 15.9 | 280.511 |
| 0 | 0 | 2 | 5.55 | 16.0 | 133.6 | 0 | 0 | 2 | 5.5 | 16.1 | 435.8349 |
| 2 | 0 | −2 | 5.54 | 16.0 | 389.5 | 2 | 0 | −2 | 5.5 | 16.2 | 114.3189 |
| 2 | 1 | 1 | 5.38 | 16.5 | 1332.0 | 2 | 1 | 1 | 5.4 | 16.5 | 1002.419 |
| 3 | −1 | −1 | 5.36 | 16.5 | 1088.2 | 3 | −1 | −1 | 5.3 | 16.6 | 1037.016 |
| 1 | 0 | 2 | 5.13 | 17.3 | 1250.7 | 1 | 0 | 2 | 5.1 | 17.4 | 1159.756 |
| 3 | 0 | −2 | 5.12 | 17.3 | 1174.2 | 3 | 0 | −2 | 5.1 | 17.5 | 1026.988 |
| 4 | 1 | 0 | 4.71 | 18.8 | 175.8 | 4 | 1 | 0 | 4.7 | 18.8 | 211.0233 |
| 3 | 1 | 1 | 4.68 | 18.9 | 4.89460 | 3 | 1 | 1 | 4.7 | 19.0 | 86.7 |
| 4 | −1 | −1 | 4.67 | 19.0 | 235.2 | 4 | −1 | −1 | 4.7 | 19.1 | 0.00000 |
| 5 | 0 | 0 | 4.66 | 19.0 | 0.00000 | 5 | 0 | 0 | 4.6 | 19.1 | 139.0242 |
| 1 | −1 | −2 | 4.65 | 19.1 | 844.8 | 1 | −1 | −2 | 4.6 | 19.2 | 717.5275 |
| 2 | 0 | 2 | 4.61 | 19.2 | 42.7 | 2 | 0 | 2 | 4.6 | 19.4 | 344.9359 |
| 4 | 0 | −2 | 4.59 | 19.3 | 400.5 | 4 | 0 | −2 | 4.5 | 19.5 | 1910.591 |
| 0 | 1 | 2 | 4.57 | 19.4 | 1361.3 | 0 | 1 | 2 | 4.5 | 19.6 | 193.0019 |
| 2 | −1 | −2 | 4.56 | 19.4 | 2611.8 | 2 | −1 | −2 | 4.5 | 19.6 | 1821.501 |
| 1 | 1 | 2 | 4.33 | 20.5 | 1435.0 | 1 | 1 | 2 | 4.3 | 20.6 | 586.1714 |
| 3 | −1 | −2 | 4.32 | 20.6 | 589.5 | 3 | −1 | −2 | 4.3 | 20.7 | 1477.621 |
| 3 | 0 | 2 | 4.08 | 21.7 | 61.4 | 4 | 1 | 1 | 4.1 | 21.9 | 0.00000 |
| 4 | 1 | 1 | 4.07 | 21.8 | 1908.8 | 3 | 0 | 2 | 4.1 | 21.9 | 442.9748 |
| 5 | 0 | −2 | 4.07 | 21.8 | 918.3 | 5 | −1 | −1 | 4.0 | 21.9 | 2226.067 |

TABLE 2-continued

Peak List of Ketoprofen Lysine co-crystal Form 4 and Form 1

| Form 4 | | | | | | Form 1 | | | | | |
|---|---|---|---|---|---|---|---|---|---|---|---|
| h | k | l | d(Å) | 2θ(deg) | Intensity | h | k | l | d(Å) | 2θ(deg) | Intensity |
| 5 | −1 | −1 | 4.06 | 21.9 | 31.0 | 5 | 0 | −2 | 4.0 | 22.0 | 0.00042 |
| 5 | 1 | 0 | 4.03 | 22.0 | 1274.5 | 0 | 2 | 0 | 4.0 | 22.1 | 111.8395 |
| 0 | 2 | 0 | 4.02 | 22.1 | 102.2 | 5 | 1 | 0 | 4.0 | 22.1 | 1149.957 |
| 2 | 1 | 2 | 4.00 | 22.2 | 159.7 | 2 | 1 | 2 | 4.0 | 22.3 | 14.31045 |
| 4 | −1 | −2 | 3.98 | 22.3 | 90.5 | 1 | 2 | 0 | 4.0 | 22.4 | 396.7589 |
| 1 | 2 | 0 | 3.96 | 22.4 | 372.0 | 4 | −1 | −2 | 4.0 | 22.5 | 61.90912 |
| 6 | 0 | 0 | 3.88 | 22.9 | 1165.3 | 6 | 0 | 0 | 3.9 | 23.0 | 976.6281 |
| 2 | 2 | 0 | 3.80 | 23.4 | 0.00000 | 2 | 2 | 0 | 3.8 | 23.4 | 0.00000 |
| 0 | 2 | 1 | 3.78 | 23.5 | 1279.1 | 0 | 2 | 1 | 3.8 | 23.5 | 1225.846 |
| 1 | −2 | −1 | 3.78 | 23.5 | 12.6 | 1 | −2 | −1 | 3.8 | 23.5 | 0.00012 |
| 1 | 2 | 1 | 3.68 | 24.1 | 29.5 | 1 | 2 | 1 | 3.7 | 24.1 | 28.52559 |
| 2 | −2 | −1 | 3.68 | 24.2 | 48.6 | 2 | −2 | −1 | 3.7 | 24.2 | 5.65006 |
| 3 | 1 | 2 | 3.64 | 24.4 | 78.8 | 3 | 1 | 2 | 3.6 | 24.5 | 469.2507 |
| 5 | −1 | −2 | 3.63 | 24.5 | 478.4 | 5 | −1 | −2 | 3.6 | 24.7 | 1.84273 |
| 4 | 0 | 2 | 3.62 | 24.6 | 220.2 | 4 | 0 | 2 | 3.6 | 24.7 | 30.77004 |
| 6 | 0 | −2 | 3.60 | 24.7 | 95.1 | 3 | 2 | 0 | 3.6 | 24.9 | 1293.778 |
| 3 | 2 | 0 | 3.57 | 24.9 | 1455.9 | 6 | 0 | −2 | 3.6 | 24.9 | 86.76020 |
| 5 | 1 | 1 | 3.56 | 25.0 | 0.00000 | 5 | 1 | 1 | 3.6 | 25.0 | 24.81936 |
| 6 | −1 | −1 | 3.56 | 25.0 | 0.00000 | 6 | −1 | −1 | 3.5 | 25.1 | 18.50564 |
| 2 | 2 | 1 | 3.51 | 25.3 | 186.7 | 2 | 2 | 1 | 3.5 | 25.3 | 893.8421 |
| 3 | −2 | −1 | 3.51 | 25.4 | 625.9 | 3 | −2 | −1 | 3.5 | 25.4 | 1.49105 |
| 6 | 1 | 0 | 3.49 | 25.5 | 47.1 | 6 | 1 | 0 | 3.5 | 25.5 | 105.3335 |
| 1 | −1 | −3 | 3.43 | 25.9 | 620.0 | 1 | −1 | −3 | 3.4 | 26.2 | 641.4867 |
| 2 | −1 | −3 | 3.43 | 26.0 | 273.2 | 2 | −1 | −3 | 3.4 | 26.2 | 208.4548 |
| 0 | 1 | 3 | 3.36 | 26.5 | 64.1 | 0 | 1 | 3 | 3.3 | 26.8 | 60.35221 |
| 3 | −1 | −3 | 3.35 | 26.5 | 44.4 | 3 | −1 | −3 | 3.3 | 26.8 | 0.00000 |
| 7 | 0 | 0 | 3.33 | 26.8 | 102.2 | 7 | 0 | 0 | 3.3 | 26.9 | 146.0823 |
| 4 | 2 | 0 | 3.31 | 26.9 | 0.00000 | 4 | 2 | 0 | 3.3 | 26.9 | 0.00000 |
| 4 | 1 | 2 | 3.30 | 27.0 | 0.00000 | 3 | 2 | 1 | 3.3 | 27.0 | 132.7653 |
| 3 | 2 | 1 | 3.30 | 27.0 | 364.5 | 4 | −2 | −1 | 3.3 | 27.1 | 450.9335 |
| 4 | −2 | −1 | 3.29 | 27.1 | 226.0 | 4 | 1 | 2 | 3.3 | 27.1 | 0.00000 |
| 1 | −2 | −2 | 3.29 | 27.1 | 0.00000 | 1 | −2 | −2 | 3.3 | 27.2 | 0.00000 |
| 6 | −1 | −2 | 3.29 | 27.1 | 0.00000 | 6 | −1 | −2 | 3.3 | 27.3 | 12.30758 |
| 0 | 2 | 2 | 3.25 | 27.4 | 1086.9 | 0 | 2 | 2 | 3.2 | 27.5 | 1083.624 |
| 2 | −2 | −2 | 3.25 | 27.4 | 727.2 | 2 | −2 | −2 | 3.2 | 27.5 | 688.8038 |
| 1 | 1 | 3 | 3.23 | 27.6 | 309.7 | 1 | 1 | 3 | 3.2 | 27.8 | 192.3856 |
| 4 | −1 | −3 | 3.22 | 27.7 | 170.9 | 5 | 0 | 2 | 3.2 | 27.8 | 73.71219 |
| 5 | 0 | 2 | 3.22 | 27.7 | 23.5 | 4 | −1 | −3 | 3.2 | 27.9 | 289.2207 |
| 7 | 0 | −2 | 3.20 | 27.8 | 35.9 | 7 | 0 | −2 | 3.2 | 28.0 | 96.01039 |
| 1 | 2 | 2 | 3.16 | 28.2 | 25.2 | 1 | 2 | 2 | 3.2 | 28.2 | 38.54196 |
| 3 | −2 | −2 | 3.16 | 28.2 | 0.00000 | 3 | −2 | −2 | 3.2 | 28.3 | 0.00001 |
| 6 | 1 | 1 | 3.15 | 28.3 | 398.5 | 6 | 1 | 1 | 3.1 | 28.4 | 332.1199 |
| 7 | −1 | −1 | 3.14 | 28.4 | 231.4 | 7 | −1 | −1 | 3.1 | 28.5 | 347.4366 |
| 7 | 1 | 0 | 3.07 | 29.0 | 59.2 | 7 | 1 | 0 | 3.1 | 29.1 | 69.70481 |
| 2 | 1 | 3 | 3.06 | 29.2 | 149.5 | 4 | 2 | 1 | 3.1 | 29.2 | 21.12850 |
| 4 | 2 | 1 | 3.06 | 29.2 | 478.2 | 5 | −2 | −1 | 3.1 | 29.2 | 784.9 |
| 5 | −2 | −1 | 3.06 | 29.2 | 225.8 | 5 | 2 | 0 | 3.0 | 29.3 | 0.00000 |
| 5 | −1 | −3 | 3.05 | 29.3 | 0.00000 | 2 | 1 | 3 | 3.0 | 29.4 | 147.6632 |
| 5 | 2 | 0 | 3.04 | 29.3 | 0.00000 | 5 | −1 | −3 | 3.0 | 29.5 | 0.00000 |
| 2 | 2 | 2 | 3.03 | 29.5 | 140.4 | 2 | 2 | 2 | 3.0 | 29.5 | 467.9161 |
| 4 | −2 | −2 | 3.02 | 29.5 | 291.7 | 4 | −2 | −2 | 3.0 | 29.6 | 0.00006 |
| 5 | 1 | 2 | 2.99 | 29.9 | 53.6 | 5 | 1 | 2 | 3.0 | 30.0 | 64.18669 |
| 7 | −1 | −2 | 2.98 | 30.0 | 39.6 | 7 | −1 | −2 | 3.0 | 30.2 | 60.65774 |
| 8 | 0 | 0 | 2.91 | 30.7 | 26.5 | 8 | 0 | 0 | 2.9 | 30.8 | 42.02372 |

The XRPD diffractograms showed some relevant differences in the region from 15 to 27° 2theta with the peaks showing similar relative intensity.

Ketoprofen Lysine co-crystal Form 1 showed the characteristic peaks at 15.7; 16.2; 17.5; 19.4; 19.5; 19.6; 21.9; 24.7; 24.9; 26.2; 26.8° 2theta while Ketoprofen lysine co-crystal Form 4 showed the distinguishing peaks at 15.5; 16.0; 17.3; 19.2; 19.3; 19.4; 21.7; 24.5; 24.7; 25.9; 26.0; 26.5° 2theta: these peaks have a shift ≥0.2 deg. The peaks of Ketoprofen Lysine co-crystal Form 4 with a shift of 0.3 degrees were found at 25.9 vs 26.2, 26.5 vs 26.8, 26.5 vs 26.8.

As it is clearly visible from FIG. 3, Ketoprofen Lysine co-crystal Form 4 XRPD pattern showed slight but not negligible differences when compared to the XRPD pattern observed for Form 1.

According to XRPD analysis, it appears that Ketoprofen Lysine co-crystal Form 4 represents a polymorph of Ketoprofen Lysine co-crystal Form 1 with similar crystallinity.

The Ketoprofen Lysine co-crystal Form 4 of the present invention is distinguished from the previous Ketoprofen Lysine Salt, as resulted from the analysis reported herein below.

In particular, the XRPD spectra of Ketoprofen Lysine Salt is shown in FIG. 1A.

The characteristic XRPD peaks of Ketoprofen Lysine Salt are reported in the following Table 3.

TABLE 3

XRPD Peak List of Ketoprofen Lysine Salt

| Pos. [°2Th.] | Height [cts] | FWHM [°2Th.] | d-spacing [Å] | Rel. Int [%] |
|---|---|---|---|---|
| 3.9325 | 2846.60 | 0.1476 | 22.46912 | 100.00 |
| 7.8614 | 122.69 | 0.1181 | 11.24637 | 4.31 |
| 8.5371 | 92.20 | 0.1181 | 10.35764 | 3.24 |
| 9.1615 | 141.64 | 0.1968 | 9.65313 | 4.98 |
| 11.0605 | 527.66 | 0.1181 | 7.99966 | 18.54 |
| 11.8024 | 131.06 | 0.2362 | 7.49843 | 4.60 |
| 13.0204 | 1516.34 | 0.0689 | 6.79958 | 53.27 |
| 14.1357 | 181.38 | 0.1968 | 6.26551 | 6.37 |
| 15.0097 | 72.85 | 0.1968 | 5.90258 | 2.56 |
| 17.4211 | 652.89 | 0.1574 | 5.09063 | 22.94 |
| 18.8604 | 2197.33 | 0.0689 | 4.70525 | 77.19 |
| 19.4898 | 678.61 | 0.1181 | 4.55471 | 23.84 |
| 20.9970 | 1941.40 | 0.0787 | 4.23104 | 68.20 |
| 21.4845 | 2046.59 | 0.1378 | 4.13613 | 71.90 |
| 22.2596 | 1258.41 | 0.1771 | 3.99383 | 44.21 |
| 22.9984 | 616.52 | 0.0787 | 3.86717 | 21.66 |
| 23.6473 | 222.80 | 0.2362 | 3.76250 | 7.83 |
| 24.6845 | 207.27 | 0.3149 | 3.60672 | 7.28 |
| 25.8298 | 707.10 | 0.0787 | 3.44933 | 24.84 |
| 26.6005 | 977.38 | 0.0886 | 3.35111 | 34.34 |
| 28.3958 | 134.48 | 0.1574 | 3.14320 | 4.72 |
| 29.2001 | 419.42 | 0.1771 | 3.05843 | 14.73 |
| 30.7454 | 46.23 | 0.3149 | 2.90814 | 1.62 |
| 31.9837 | 376.56 | 0.1378 | 2.79832 | 13.23 |
| 32.7583 | 225.02 | 0.1574 | 2.73389 | 7.90 |
| 33.5545 | 173.12 | 0.2362 | 2.67082 | 6.08 |
| 35.3568 | 377.39 | 0.1378 | 2.53870 | 13.26 |
| 36.6756 | 185.11 | 0.2755 | 2.45038 | 6.50 |
| 38.3677 | 278.83 | 0.3149 | 2.34612 | 9.80 |

The XRPD diffractograms showed relevant signals in the region from 13 to 27° 2theta, in particular Ketoprofen Lysine salt showed the most intense peaks at 13.0, 17.4, 18.9, 19.5, 20.9, 21.5 and 26.6° 2theta, while Ketoprofen lysine co-crystal Form 4 showed the distinguishing peaks at 15.5; 16.0; 17.3, 19.2; 19.3; 19.4; 21.7; 24.5; 24.7; 25.9; 26.0; 26.5° 2theta.

3. TGA Analysis

The analysis was carried out using the Mettler Toledo TGA/DSC1.

The sample was weighed in an aluminum pan hermetically sealed with an aluminum pierced cover. The analysis was performed heating the sample from 25° C. to 320° C. at 10 K/min.

Temperature Data

| Temperature range | 25° C. to 320° C. |
|---|---|
| Temperature accuracy | ±1K |
| Temperature precision | ±0.4K |
| Heating rate | 10K/min |
| Cooling time | 20 min (1100 . . . 100° C.) |
| Sample volume | ≤100 µL |

Special Modes

| Automation | 34 sample positions |
|---|---|
| TGA-FTIR | coupled with Thermo Nicolet iS10 spectrometer |
| Balance data | XP5 |
| Measurement range | ≤5 g |
| Resolution | 1.0 µg |
| Weighing accuracy | 0.005% |
| Weighing precision | 0.0025% |
| Internal ring weights | 2 |
| Blank curve reproducibility | better than ±10 µg over the whole temperature range |

Figure 9:
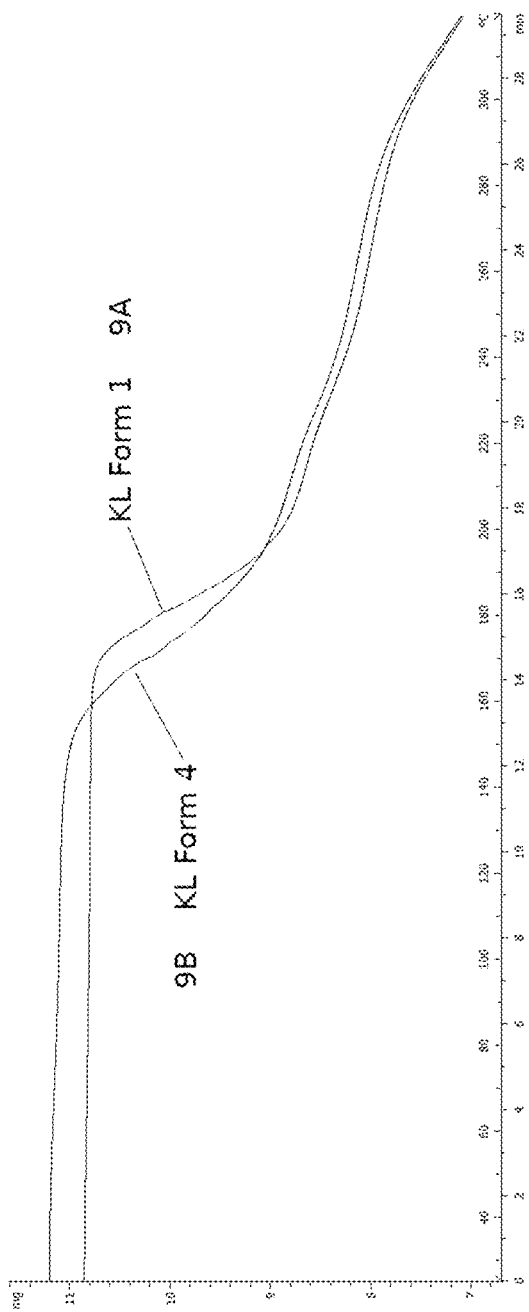
FIG. 9. TGA thermograms of Ketoprofen Lysine co-crystal Form 1 (9A) and Ketoprofen Lysine co-crystal Form 4 (9B).

Ketoprofen Lysine co-crystal Form 4 TGA thermogram is reported in FIG. 9 in comparison with the thermogram of Form 1.

The thermogram of Form 4 showed multiple weight losses:
- 25-130° C. (1.21% w/w) limited to EGA sensitivity no organic solvent evolution was observed (probable water traces evolution);
- 150-170° C. MPR traces evolution concomitant with carbon dioxide evolution;
- 120-320° C. (35.53% w/w) degradation gases evolution (mainly carbon dioxide followed by ammonia evolution).

The TGA curve profile of Ketoprofen Lysine co-crystal Form 4 is slightly different from that of Ketoprofen Lysine co-crystal Form 1 with the latter showing a weight loss of 34.40% due to degradation compared to 35.53% of Ketoprofen Lysine co-crystal Form 4.

4. DSC Analysis

The analysis was carried out using a DSC Mettler Toledo DSC1.

The sample was weighed in an aluminum pan hermetically sealed with an aluminum cover. The analysis was performed heating the sample from 25° C. to 320° C. at 10 K/min.

Temperature Data

| Temperature range | 25° C. to 320° C. |
|---|---|
| Temperature accuracy | ±0.2K |
| Temperature precision | ±0.02K |
| Heating rate | 10K/min |
| Cooling time | 5 min (100° C. . . . 0° C.) |

Calorimetric Data

| Sensor type | FRS5 |
|---|---|
| Sensor material | Ceramic |
| Number of thermocouples | 56 |
| Signal time constant | 1.8 s |
| Indium peak (height to width) | 17 |
| TAWN resolution | 0.12 |
| Sensitivity | 11.9 |
| Resolution | 0.04 µw |
| Digital resolution | 16.8 million points |

Figure 10:
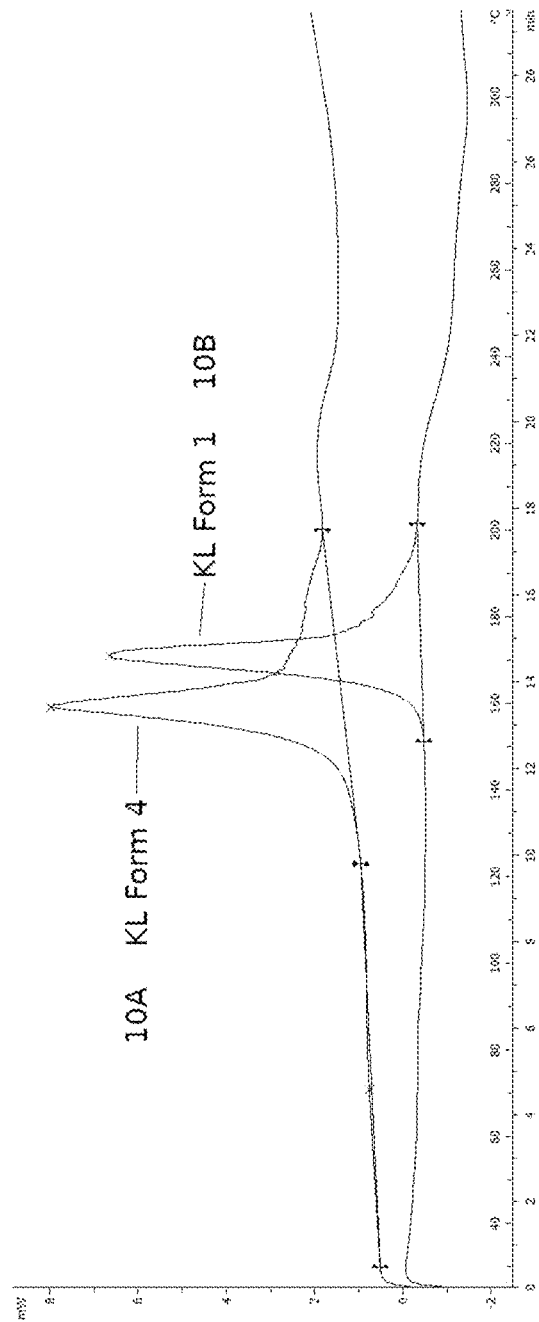
FIG. 10. DSC thermograms of Ketoprofen Lysine co-crystal Form 4 (10A), Ketoprofen Lysine co-crystal Form 1 (10B).
Figure 13:
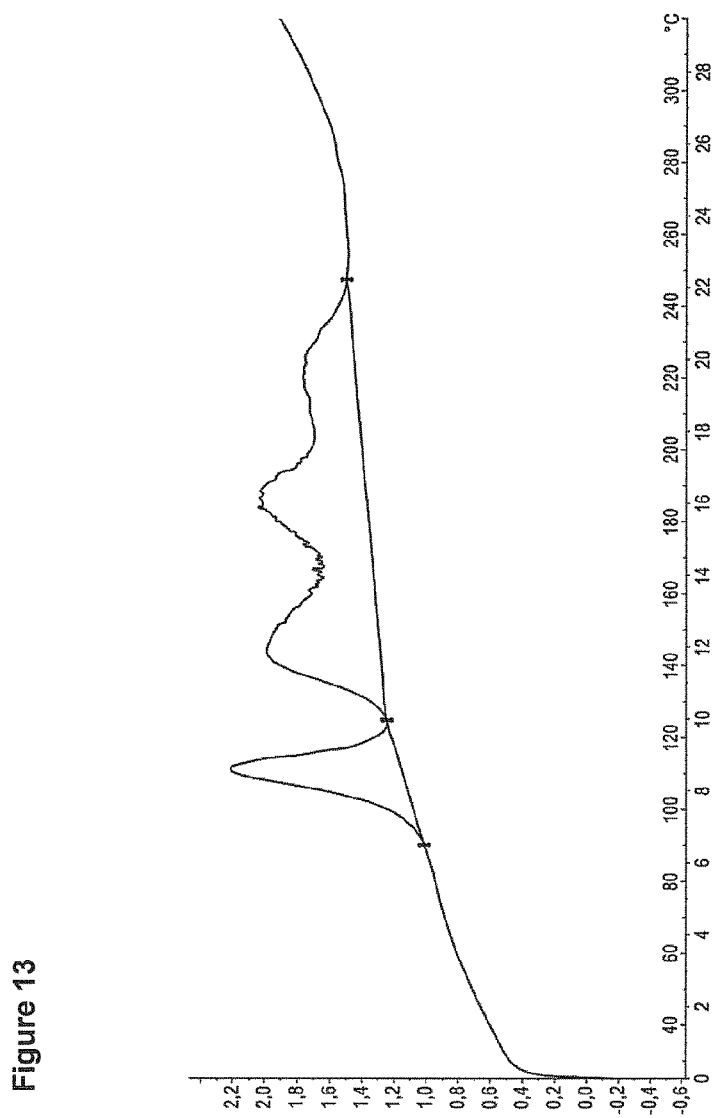
FIG. 13. DSC thermogram of Ketoprofen Lysine Salt.

The DSC thermogram for Ketoprofen Lysine co-crystal Form 4 is reported in FIG. 10 (10A) in comparison with Ketoprofen Lysine co-crystal Form 1 (10B). The DSC thermogram for Ketoprofen Lysine Salt is shown in FIG. 13.

The DSC curve of Ketoprofen Lysine co-crystal Form 4 showed multiple endothermic peaks:
- $1^{st}$ very broad endothermic peak (7.10 J/g) onset 29.54° C., peak 70.81° C., endset 122.54° C.;
- $2^{nd}$ endothermic peak (270.93 J/g) onset 152.18° C., peak 158.82° C., endset 166.43° C. due to melting process readily followed by degradation steps.

In conclusion, the DSC thermogram of KL Form 4 had a profile different from that of KL Form 1 with the latter showing e endothermic peak at a higher onset temperature (164.14° C. Form 1 vs 152.18° C. Form 4). Furthermore, both the polymorphs thermograms differ from the thermogram of the previous Ketoprofen Lysine Salt which showed the 1st endothermic peak at 110.92° C. (54.67 J/g, onset 100.53° C., end-set 118.35° C.) and above 120° C. multiple partially overlapped endothermic peaks due to degradation steps.

Preferably, present Ketoprofen Lysine co-crystal Form 4 characterized by an endothermic peak at 158.8° C.±2° C. measured by DSC according to the method reported above.

5. FT-IR and FT-Raman Analysis

FT-IR analysis was carried out using a Thermo Nicolet iS50—ATR module Spectrometer equipped with:
Smart Performer Diamond
DTGS KBr Detector
IR Source
KBr Beam splitter
Data Collection Information

| | |
|---|---|
| Number of sample scans | 32 |
| Number of background scans | 32 |
| Collection length | 47.29 sec |
| Resolution | 4.000 |
| Levels of zero filling | 2 |
| Number of scan points | 16672 |
| Number of FFT points | 65536 |
| Laser frequency | 15798.3 cm$^{-1}$ |
| Interferogram peak position | 8192 |
| Apodization | N-B strong |
| Phase correction | Mertz |
| Number of background scans | 32 |
| Background gain | 1.0 |
| Sample gain | 8 |
| Aperture | 100 |
| Optical velocity | 0.6329 |

FT-Raman spectra were recorded with a Nicolet iS50 FT-IR Spectrometer. The excitation source was a Nd-YAG laser (1064 nm) in the backscattering (180°) configuration. The focused laser beam diameter was approximately 50 mm and the spectral resolution 4 cm$^{-1}$. The spectra were recorded with a laser power at the sample of approximately 100 mW.

Figure 6:
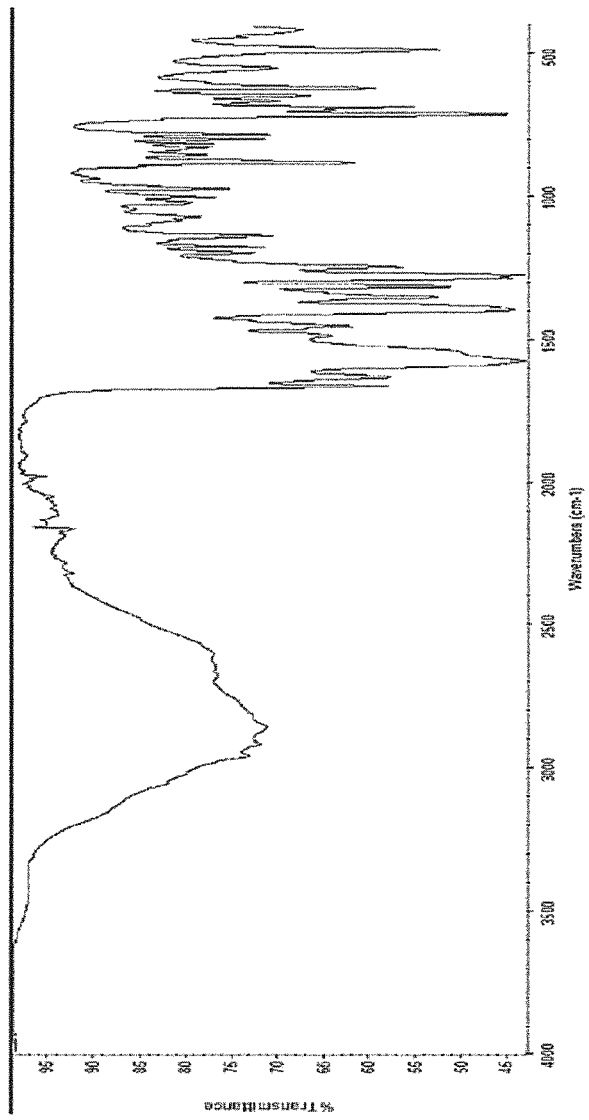
FIG. 6. FT-IR spectra of Ketoprofen Lysine co-crystal Form 4.
Figure 8:
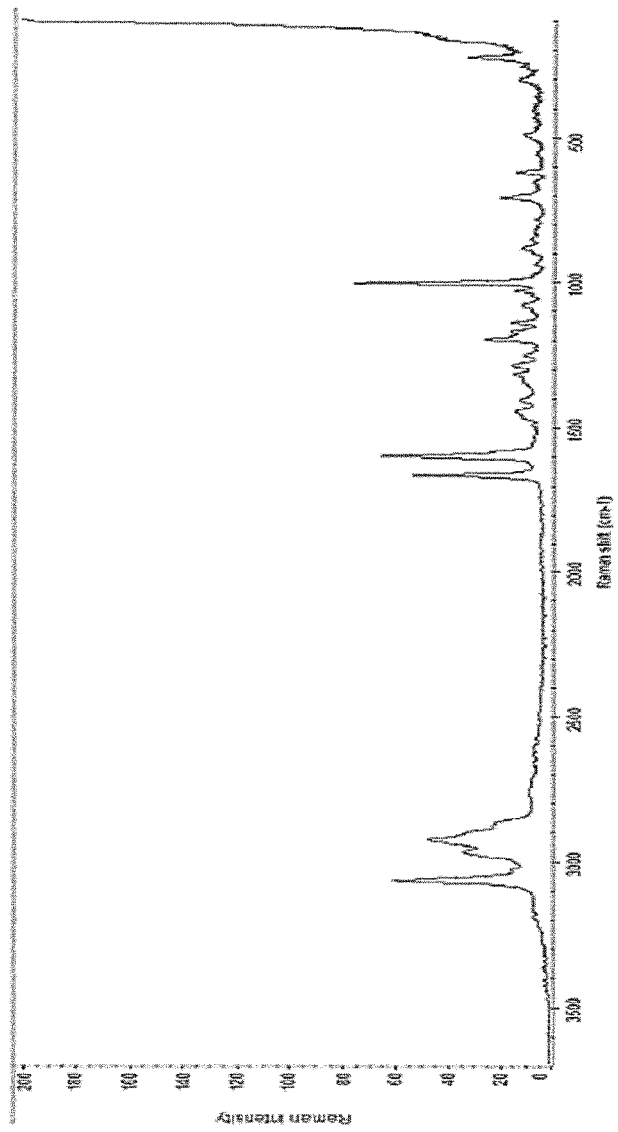
FIG. 8. FT-Raman spectrum of Ketoprofen Lysine co-crystal Form 4.

FT-IR spectrum and FT-Raman spectrum of Ketoprofen Lysine co-crystal Form 4 according to the invention and their peak lists are reported in the FIGS. 6 and 8 and in Tables 4 and 5, respectively.

TABLE 4

Peak list of the FT-IR spectrum of Ketoprofen Lysine co-crystal Form 4.

| Position | Intensity |
|---|---|
| 413.78 | 67.157 |
| 486.69 | 52.203 |
| 549.27 | 69.863 |
| 619.37 | 59.317 |
| 646.32 | 66.437 |
| 664.47 | 69.634 |
| 686.62 | 54.994 |
| 695.94 | 62.593 |
| 708.32 | 44.602 |
| 715.08 | 44.879 |
| 783.11 | 70.672 |
| 796.95 | 71.172 |
| 814.43 | 76.776 |
| 825.28 | 76.814 |
| 852.84 | 77.556 |
| 881.61 | 61.448 |
| 935.19 | 89.212 |

TABLE 4-continued

Peak list of the FT-IR spectrum of Ketoprofen Lysine co-crystal Form 4.

| Position | Intensity |
|---|---|
| 971.30 | 75.020 |
| 1002.80 | 76.495 |
| 1020.87 | 79.134 |
| 1070.62 | 78.202 |
| 1138.03 | 70.370 |
| 1175.55 | 71.146 |
| 1195.85 | 72.333 |
| 1246.58 | 56.277 |
| 1274.44 | 42.814 |
| 1284.79 | 44.134 |
| 1314.96 | 50.944 |
| 1352.19 | 52.273 |
| 1395.44 | 43.982 |
| 1447.92 | 62.117 |
| 1455.16 | 61.676 |
| 1486.37 | 63.923 |
| 1574.97 | 42.632 |
| 1630.50 | 57.448 |
| 1663.28 | 57.708 |
| 1980.26 | 94.860 |
| 2112.10 | 93.684 |
| 2161.87 | 91.820 |
| 2859.34 | 70.914 |

TABLE 5

Peak list of FT-Raman spectrum of Ketoprofen Lysine co-crystal Form 4.

| Position | Intensity |
|---|---|
| 225.36 | 32.070 |
| 303.37 | 12.889 |
| 310.75 | 10.746 |
| 489.13 | 11.052 |
| 495.84 | 10.146 |
| 619.22 | 13.629 |
| 708.71 | 20.149 |
| 876.20 | 10.836 |
| 881.70 | 11.685 |
| 1002.40 | 76.305 |
| 1028.24 | 14.328 |
| 1075.63 | 11.559 |
| 1137.46 | 15.818 |
| 1160.94 | 10.609 |
| 1169.59 | 15.780 |
| 1182.53 | 16.692 |
| 1194.32 | 25.557 |
| 1251.04 | 10.617 |
| 1284.54 | 14.979 |
| 1314.25 | 14.772 |
| 1330.10 | 11.031 |
| 1337.82 | 11.315 |
| 1351.50 | 9.284 |
| 1405.55 | 12.189 |
| 1439.59 | 13.481 |
| 1444.25 | 13.587 |
| 1452.37 | 11.869 |
| 1461.24 | 11.838 |
| 1596.48 | 65.524 |
| 1662.39 | 53.474 |
| 2864.71 | 21.377 |
| 2873.96 | 22.155 |
| 2922.56 | 47.154 |
| 2966.38 | 33.240 |
| 3026.18 | 15.698 |
| 3064.22 | 60.520 |

Figure 7:
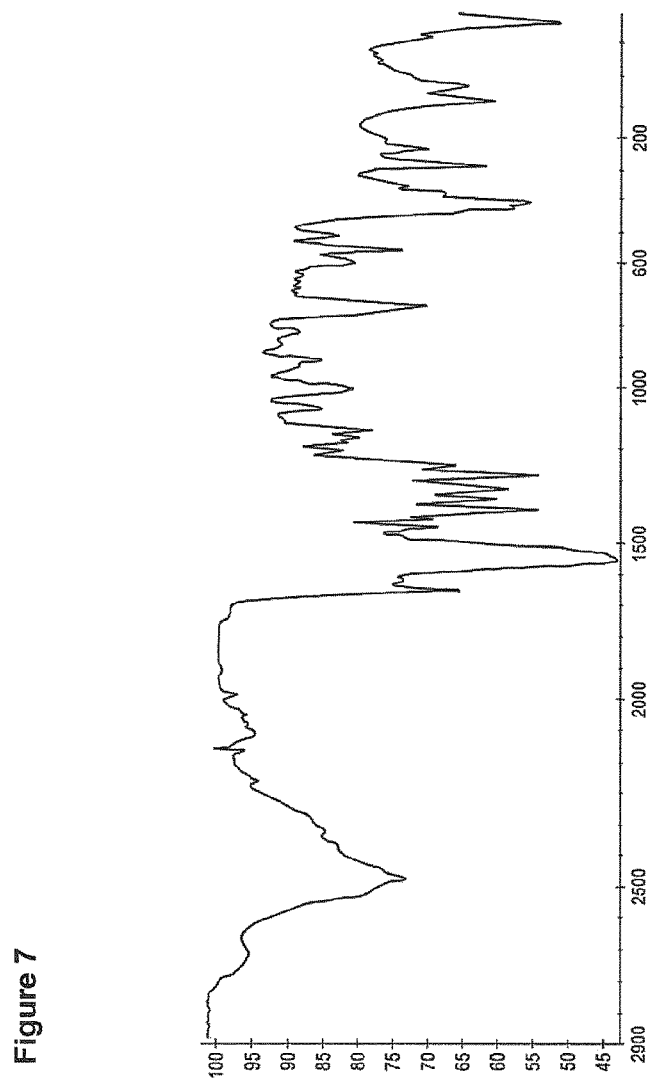
FIG. 7: FT-IR spectra of Ketoprofen Lysine Salt.

FT-IR spectrum and the FT-IR peak list of Ketoprofen Lysine Salt are reported in FIG. 7 and in Table 6 below.

TABLE 6

Peak list of the FT-IR spectrum of Ketoprofen Lysine Salt

| Position (cm$^{-1}$) | Intensity |
|---|---|
| 414 | 51.203 |
| 437 | 69.203 |
| 463 | 76.990 |
| 475 | 76.368 |
| 518 | 63.818 |
| 539 | 60.253 |
| 621 | 69.700 |
| 645 | 61.177 |
| 675 | 72.596 |
| 689 | 66.858 |
| 706 | 55.062 |
| 713 | 56.968 |
| 756 | 82.432 |
| 779 | 73.315 |
| 802 | 80.054 |
| 821 | 87.571 |
| 831 | 88.245 |
| 871 | 69.950 |
| 911 | 88.295 |
| 929 | 90.674 |
| 958 | 84.976 |
| 967 | 88.368 |
| 1007 | 80.471 |
| 1072 | 84.876 |
| 1138 | 77.764 |
| 1160 | 79.502 |
| 1179 | 81.151 |
| 1201 | 81.656 |
| 1248 | 65.816 |
| 1281 | 53.933 |
| 1320 | 58.117 |
| 1358 | 59.706 |
| 1393 | 53.834 |
| 1420 | 69.095 |
| 1448 | 68.893 |
| 1479 | 72.920 |
| 1532 | 44.203 |
| 1538 | 43.543 |
| 1557 | 42.899 |
| 1615 | 73.015 |
| 1652 | 65.459 |
| 2050 | 95.210 |
| 2089 | 95.059 |
| 2112 | 94.226 |
| 2324 | 93.704 |
| 2650 | 84.309 |
| 2879 | 75.764 |
| 2942 | 72.790 |
| 3420 | 95.023 |

6. Solid State NMR

Solid-state NMR (ss-NMR) spectra were acquired with a Breaker Avance II 400 Ultra Shield instrument, operating at 400.23, 100.63 and 40.56 MHz, respectively for $^1H$, $^{13}C$ and $^{15}N$ nuclei. Powder samples were packed into cylindrical zirconia rotors with a 4 mm o.d. and an 80 µL volume. A certain amount of sample was collected and used without further preparations to fill the rotor.

$^{13}C$ CPMAS (cross polarized magic angle spinning) spectra were acquired at a spinning speed of 12 kHz, using a ramp cross-polarization pulse sequence with ss-NMR spectra were acquired with a Bruker Avance II 400 Ultra Shield instrument, operating at 400.23, 100.63 and 40.56 MHz, respectively for $^1H$, $^{13}C$ and $^{15}N$ nuclei. Powder samples were packed into cylindrical zirconia rotors with a 4 mm o.d. and an 80 µL volume. A certain amount of sample was collected and used without further preparations to fill the rotor.

$^{13}C$ CPMAS spectra were acquired at a spinning speed of 12 kHz, using a ramp cross-polarization pulse sequence with a 90° 1H pulse of 3.60 µs, a contact time of 3 ms, optimized recycle delays between 1.5 and 3.5 s, a number of scans in the range 430-640, depending on the sample.

$^{15}N$ CPMAS spectra were acquired at a spinning speed of 9 kHz using a ramp cross-polarization pulse sequence with a 90° $^1H$ pulse of 3.60 µs, a contact time between 1 and 4 ms, optimized recycle delays between 1.1 and 3.4 s, a number of scans in the range 14330-22770, depending on the sample.

For each spectrum, a two-pulse phase modulation (TPPM) decoupling scheme was used, with a radiofrequency field of 69.4 kHz.

$^{13}C$ chemical shift scale was calibrated through the methylene signal of external standard glycine (at 43.7 ppm).

$^{15}N$ chemical shift scale was calibrated through the signal of external standard glycine (at 33.4 ppm with reference to $NH_3$).

2D $^1H$—$^{13}C$ on- and off-resonance (short and long-range, respectively) HETCOR spectra were measured with contact times of 0.1 and 7 ms, respectively, and FSLG t1 decoupling and TPPM t2 decoupling (rf fields of 82 kHz).

288 and 384 scans were averaged for 88 and 128 increments, respectively with 3.4 s of relaxation delay. The indirect $^1H$ chemical shift scale in the HETCOR spectra was experimentally corrected by a scaling factor of 1/3 because the $^1H$ chemical-shift dispersion is scaled by a factor of 1/3 during FSLG decoupling.

In FIG. 4, the $^{13}C$-NMR spectra of Ketoprofen Lysine Salt (4A), of Ketoprofen Lysine co-crystal Form 4 (4B) and an enlargement of the overlapped spectra of Ketoprofen Lysine co-crystal Form 1, Ketoprofen Lysine co-crystal Form 4, Ketoprofen and Lysine (4C), acquired at room temperature with a spinning speed of 12 kHz, are shown.

The $^{13}C$ CPMAS solid-state NMR spectra comparative Ketoprofen Lysine Salt is also reported in FIG. 4A.

As appears from the spectra of FIG. 4, the resonances of Ketoprofen Lysine Salt are distinguished from those of the present Ketoprofen Lysine co-crystal Form 4 and both differ from the characteristic signals of the starting materials Ketoprofen and Lysine.

Characteristic $^{13}C$ ss-NMR resonances for Ketoprofen Lysine co -crystal Form 4 are shown in Table 7 below:

TABLE 7

$^{13}C$ ss-NMR resonances for Ketoprofen Lysine co-crystal Form 4
δC (ppm)

| |
|---|
| 197.2 |
| 196.1 |
| 179.4 |
| 177.6 |
| 174.5 |
| 147.4 |
| 145.8 |
| 141.0 |
| 136.4 |
| 134.8 |
| 133.0 |
| 128.6 |
| 126.8 |
| 55.1 |
| 50.2 |
| 38.8 |
| 32.2 |
| 29.6 |
| 24.7 |
| 22.3 |

The signals in the spectrum (4B) of Ketoprofen Lysine co-crystal Form 4 exhibit an average full width at half maximum (FWHM) value of 143 Hz. All resonances fall at the same chemical shift of those of Ketoprofen Lysine co-crystal Form 1, some further broad shoulders appear in the carboxylic region (170-200 ppm), as well as in the aromatic (120-150 ppm) and aliphatic (20-60 ppm) ones.

TABLE 8

$^{13}$C CPMAS solid-state NMR peak list of Ketoprofen Lysine Salt.
Ketoprofen Lysine Salt
$^{13}$C δ (ppm)

| |
|---|
| 199.8 |
| 197.8 |
| 182.2 |
| 181.1 |
| 180.0 |
| 176.6 |
| 175.7 |
| 174.3 |
| 144.5 |
| 143.8 |
| 142.7 |
| 138.2 |
| 134.6 |
| 131.8 |
| 129.5 |
| 128.6 |
| 127.2 |
| 125.9 |
| 564 |
| 55.5 |
| 20.8 |
| 49.4 |
| 48.2 |
| 38.6 |
| 38.2 |
| 32.3 |
| 31.7 |
| 26.4 |
| 25.7 |
| 22.5 |
| 22.0 |

Table 8 shows the peak list of the characteristic signals of Ketoprofen Lysine Salt. The average full width at half-maximum value (133 Hz) is consistent with a moderately crystalline phase. The carboxylic signals infer a 1:1 ratio between Ketoprofen and Lysine.

Possibly six independent molecules in the unit cell are evaluable by $^{13}$C CPMAS solid-state NMR spectra: the carboxylic signals infer the presence of 3 carboxylate moieties for both Ketoprofen and Lysine.

FIG. 4C shows the carboxylic region of the 13C—ss-NMR overlapped spectra of Ketoprofen Lysine co-crystal Form 4, Ketoprofen Lysine co-crystal Form 1, Ketoprofen and Lysine.

As can be seen, the signals of the polymorphs Ketoprofen Lysine co-crystal Form 1 and Ketoprofen Lysine co-crystal Form 4 are both distinguishable from the signals of Ketoprofen and Lysine. The ketone C=O signal of Ketoprofen falls at about 197.5 ppm and corresponds to a single carboxylic moiety (at about 180 ppm) in the aromatic region—being the 120-150 ppm region populated only by Ketoprofen signals—and to the methyl signal of pure Ketoprofen (at about 20 ppm).

A $^{13}$C T1-1H experiment (not shown) was performed, in order to assess the presence of different heterogeneous phases inside the analyser sample, through their T1-1H relaxation time. The analysis revealed very similar T1-1H values for all resonances, including the broad shoulders, between 1.8 and 1.9 s; thus, Ketoprofen lysine form 4 can be defined as a homogeneous phase.

FIG. 5A displays the $^{15}$N CPMAS solid-state NMR spectra of Ketoprofen Lysine co-crystal Form 4, acquired at room temperature with a spinning speed of 9 kHz, with the characteristic $^{15}$N resonances of Ketoprofen Lysine co-crystal Form 4, in particular with the signal at about 43 ppm.

FIG. 5B shows an overlap of the $^{15}$N CPMAS solid-stage NMR spectra of Ketoprofen Lysine co-crystal Form 4 and Lysine.

From the spectra it can be clearly seen that no pure Lysine is contained in Ketoprofen Lysine co-crystal Form 4.

In conclusion, according to the $^{13}$C-CPMAS and $^{15}$N CPMAS spectra discussed above it appears that:

A new homogeneous crystalline phase of Ketoprofen Lysine co-crystal was found: in the $^{13}$C CPMAS all resonances are different from the characteristic signals of pure Ketoprofen and pure Lysine. 1H T1 measurements account for the homogeneity of the adduct.

The stoichiometric ratio Ketoprofen:Lysine was found to be 1:1 from $^{13}$C and $^{15}$N CPMAS spectra: one set of $^{13}$C signals for both Ketoprofen and Lysine; only one set of $^{15}$N signals for Lysine (Ketoprofen does not contain nitrogen atoms).

Two independent molecules were found per unit cell based on $^{13}$C and $^{15}$N CPMAS spectra: one set of $^{13}$C signals for both Ketoprofen and Lysine; only one set of $^{15}$N signals for Lysine (Ketoprofen does not contain nitrogen atoms).

The adduct is a co-crystal based on $^{13}$C and $^{15}$N CPMAS: the $^{13}$C carboxylic signal of Ketoprofen falls at 177.6 ppm, consistent with the typical chemical shift of a neutral carboxylic group involved in a hydrogen bond interaction (for instance COO— in Ketoprofen Sodium salt falls at higher chemical shifts—181.4/180.5 ppm);

as for $^{15}$N signals, the ε-$NH_2$ of Lysine resonates at 32.8 ppm, a characteristic chemical shift for neutral amino groups involved in hydrogen bond interactions (the protonate $NH^{3+}$ group would fall above 35 ppm).

Lysine is in its zwitterionic form based on $^{13}$C and $^{15}$N CPMAS spectra: the $^{13}$C signal of the carboxylate group of Lysine resonates at 174.5 ppm, in accordance with the ionic nature of the moiety; the $^{15}$N signal of the α-$NH_3^+$ moiety of Lysine falls at 43.0 ppm, consistent with the protonated state of an ammonium group (α-$NH_2$ group of Lysine falls below 35 ppm).

The phase is very similar to Ketoprofen lysine Form 1 with extra peaks associated to disorder/defects; the extra resonances associated to the defects present an intermediate salt/co-crystal character (from 13C CPMAS spectra): in the $^{13}$C CPMAS ss-NMR spectrum (FIG. 4C) this is clearly visible with broad extra peaks at about 196 and 180 ppm.

7. Dissolution Rate and Solubility in Simulated Gastric Fluid (SGF)

The dissolution rate and solubility of Ketoprofen Lysine co-crystal Form 4 and Ketoprofen Lysine co-crystal Form 1 was performed in simulated gastric fluid (SGF) and simulated salivary fluid (SSF).

Methods

Solubility in Gastric Simulated Fluid (GSF) Without Pepsin (USP41) at 25° C.

An excess of solid was allowed to equilibrate under magnetic stirring. At predetermined time points an aliquot of supernatant as withdrawn, filtered, and assayed by HPLC for Ketoprofen concentration.

Intrinsic dissolution rate: 150 mg powder sample were compacted by means of a hydraulic press in a round diameter=11 mm matrix, under 3 tons force for 3 min.

The obtained compacts were maintained inside the matrix and tested in a USP41 Apparatus 2 (Distek Dissolution System 2100B) under the following conditions: 500 ml of gastric simulated fluid (GSF) without pepsin, or USP phosphate buffer pH 6.5 (PB6.5) at 37° C. and 30 rpm paddle rotation speed. The amount of solid dissolved at each time point was determined spectrophotometrically at 260 nm or by HPLC. The test was performed in 6 replicates in SGF and 3 replicates in phosphate buffer pH=6.5

Statistical analysis of the data was performed with Excel.

Solubility

The solubility of Ketoprofen Lysine co-crystal Form 4 in SGF, compared with the solubility of Ketoprofen Lysine co-crystal Form 1, is shown in the following Table 9.

TABLE 9

Solubility of Ketoprofen from in Ketoprofen-containing Ketoprofen Lysine co-crystal Form 1 and Ketoprofen Lysine co-crystal Form 4 at 25° C. (mean ± SD, n = 3)

|  | Solubility (mg/ml) |
| --- | --- |
| Ketoprofen Lysine co-crystal Form 1 | 0.243 ± 0.078 |
| Ketoprofen Lysine co-crystal Form 4 | 0.253 ± 0.089 |

The solubility of Ketoprofen Lysine co-crystal Form 4 was similar to Ketoprofen Lysine co-crystal Form 1.

Intrinsic Dissolution Rate

The intrinsic dissolution rates (IDR) of Ketoprofen Lysine co-crystal Form 1 and Ketoprofen Lysine co-crystal Form 4 in simulated gastric fluid (SGF) at pH 1.2 and in simulated salivary fluid (pH 6.5) are shown in the following Table 10:

TABLE 10

Intrinsic dissolution rates of Ketoprofen lysine co-crystals Form 1 and Form 4

| Sample | IDR (mg · cm$^{-2}$ · min$^{-1}$) | Confidence limit (95%) |
| --- | --- | --- |
| GSF (pH 1.2) | | |
| KL Form 1 (n = 6) | 0.94 | 0.7843-1.1000 |
| KL Form 4 (n = 6) | 1.16 | 0.9871-1.3310 |
| Simulated Salivary Fluid pH 6.5 | | |
| KL Form 1 (n = 3) | 4.23 | 3.5956-4.8655 |
| KL Form 4 (n = 3) | 5.16 | 4.8175-5.4955 |

From the data above, it resulted that the release of Ketoprofen at pH 1.2 (SGF) from Ketoprofen Lysine co-crystal Form 4 was faster than Ketoprofen Lysine co-crystal Form 1 (1.16 vs 0.94). At pH 6.5 (salivary pH) this difference was more marked (5.16 vs 4.23).

8. Electronic Tongue

The assay was performed by using technologically advanced taste sensors equipped with ions selective potentiometric electrodes (ISPE) sensing system that provides results with high correlation to sensory scores. This system enables the comprehensive and objective taste evaluation of foods and pharmaceuticals with high accuracy and reliability.

The response of sensor arrays has been treated using pattern recognition methods: Principal Component Analysis (PCA) and Partial Least Discriminant Analysis (PLS-DA), with the aim to 1) compare the sample solutions with reference solutions of salty, sweet and bitter taste; 2) detect the similarities or differences from time t0 (freshly prepared) at time t48 h (2 days after preparation).

In FIGS. 11A and 11B, the comparison of the sensory analysis at different post-solubilisation times of Ketoprofen Lysine co-crystal Form 4 and Ketoprofen Lysine co-crystal Form 1 samples are reported in the form of PCA scores.

In these Figures, we observed the different trend over time for the two samples. The greatest variation over time was at 6 h which is predictive of a different taste of Ketoprofen Lysine co-crystal Form 1 compared to Ketoprofen Lysine co-crystal Form 4. Minor variations were noted at the other time points.

In order to highlight the different behaviour in this test observed for Ketoprofen Lysine co-crystal Form 4, a PLS-DA model was created and plotted (11C).

From the plot of FIG. 11C it appears that Ketoprofen Lysine co-crystal Form 4 data are closer to the sweet taste zone than the data obtained with Ketoprofen Lysine co-crystal Form 1, thus supporting the expectation of a better taste of the present Ketoprofen Lysine co-crystal Form 4.

9. Particle Size Distribution

Ketoprofen Lysine co-crystal Form 4 and Ketoprofen Lysine Salt were analysed by Mastersizer laser diffraction. Particle size analysis is related to the rheological behaviour of the powder and to the dissolution rate of the product.

Instrument

Instrument Brand: Malvern
    Instrument type: Morphology G3S
    Application SW: Morphology Software 8.20

Microscope

Light source: White light, brightfield diascopic and episcopic polarizer/analyser and DIC contrast enhancement options
    Detector: 5M pixel 2592×1944 colour CCD array
    Pixel width: 2.78 μm×2.78 μm
    Optical system: Nikon CFI 60 brightfield/darkfield system
    Lens: 2.5×: 13 μm-1000 μm (nominal)
    5×: 6.5 μm-420 μm (nominal)
    10×: 3.5 μm-210 μm (nominal)
    20×: 1.75 μm-100 μm (nominal)
    50×: 0.5 μm-40 μm (nominal)

A significant variation of the particle size between Ketoprofen Lysine co-crystal Form 4 and Ketoprofen Lysine Salt was observed, as reported in the following Table 11:

TABLE 11

Comparison between the PSD of Ketoprofen Lysine co-crystal Form 4 and Ketoprofen Lysine Salt

| PSD | Ketoprofen Lysine co-crystal Form 4 | Ketoprofen Lysine Salt |
| --- | --- | --- |
| D10 (μm) | 33.68 | 83.82 |
| D50 (μm) | 84.26 | 130.78 |
| D90 (μm) | 142.94 | 347.74 |

As shown in Table 11 a significant difference in particle size distribution between Ketoprofen Lysine co-crystal Form 4 and Ketoprofen Lysine Salt was observed, with the latter showing a PSD D90 2.43-fold greater than Ketoprofen Lysine co-crystal Form 4.

Preferably, the present Ketoprofen Lysine co-crystal Form 4 is characterized by a particle size distribution in which D90 is lower than 220 µm, preferably lower than 150 µm.

The particle size of the present Ketoprofen Lysine co-crystal Form 4, lower than the particle size of the previous Ketoprofen Lysine Salt, can provide for many advantages. In fact, particle size distribution plays an important role in the preparation process (quality control) and in the development of suitable manufacturing methods. Smaller final mean particle sizes can improve content uniformity, solubility, dissolution, absorption rates and bioavailability.

A further advantage of the present Ketoprofen Lysine Co-Crystal Form 4 compared with the previous Ketoprofen Lysine Salt, is that it can be obtained directly from the crystallization step in the desired smaller particle size, thus minimizing or even avoiding downstream micronization of the powder in order to get the desired PSD, with a potential reduction of process steps, time and, in the end, manufacturing costs.

10. Crystallinity

Figure 12:
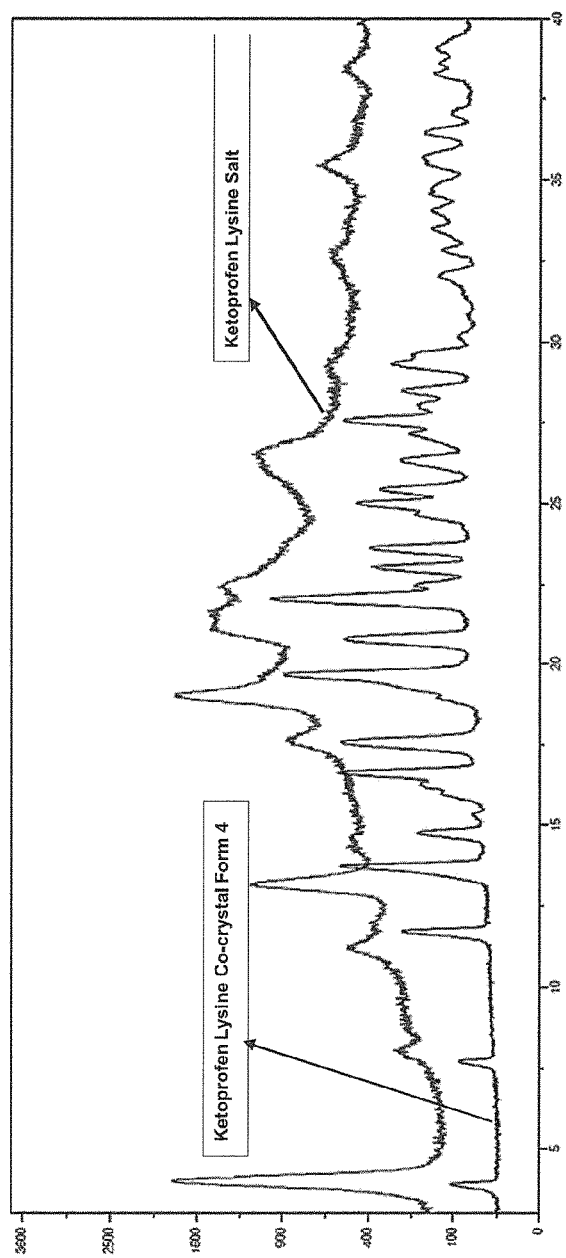
FIG. 12. XRPD pattern of Ketoprofen Lysine co-crystal Form 4 compared with Ketoprofen Lysine Salt.

As demonstrated by the XRPD analysis, Ketoprofen Lysine co-crystal Form 4 has a crystallinity significantly higher than Ketoprofen Lysine Salt where the presence of amorphous phase is evident (FIG. 12). This property is typically related with a better stability of Ketoprofen Lysine co-crystal Form 4 especially in terms of lower hygroscopicity if compared with Ketoprofen Lysine Salt.

The lower Particle Size Distribution combined with the higher crystallinity of Ketoprofen Lysine co-crystal Form 4 is advantageous over the previous Ketoprofen Lysine Salt both in relation to the setting of fluid-dynamic parameters in the formulation process and for the preparation and formulation of the coated granulate of Ketoprofen Lysine. The evaluation of the dynamic flow and the shear properties as well as stability of the powder through tests such as basic stability energy, stability index, specific energy and conditioned bulk density show greater friction phenomena in the powder bed for Ketoprofen Lysine Salt compared to Ketoprofen Lysine co-crystal Form 4. The phenomenon could be derived from the greater amorphous degree, the irregular shape and the higher hygroscopicity of Ketoprofen Lysine Salt compared to Ketoprofen Lysine co-crystal Form 4.

Furthermore, Ketoprofen oral formulations are designed for a systemic effect by absorption through the gastrointestinal tract. Both drug dissolution and permeability through the gastrointestinal tract need to be sufficiently good to reach the bloodstream. The lower particle size of Ketoprofen Lysine co-crystal Form 4, compared to Ketoprofen Lysine Salt, may be predictive of improved dissolution-rate and bioavailability (study ongoing).

Reducing the particle size increases the particle surface area in contact with the juices of the gastrointestinal tract favouring dissolution, improving safety and efficacy, as well as providing better compliance and enhanced dose tolerance.

In conclusion, Ketoprofen Lysine co-crystal Form 4 was synthetized, isolated and characterized by XRPD, TGA, DSC, FT-IR, FT-Raman and NMR.

As discussed above, XRPD pattern showed slight but not negligible differences with respect to that observed for Ketoprofen Lysine co-crystal Form 1. Moreover, based also on the rest of the analysis it resulted that Ketoprofen Lysine co-crystal Form 4 represents a polymorph of Ketoprofen Lysine co-crystal Form 1 with similar crystallinity (according to XRPD analysis) and comparable but distinguished thermal properties (similar degradation profile—TGA/EGA, and melting point at slight lower temperature—DSC analysis).

Solid-state NMR showed the presence of a homogeneous system characterized by a short-range structure almost identical with that of Ketoprofen Lysine co-crystal Form 1 featuring a site-specific disorder. Moreover, Ketoprofen and Lysine were found to be present with a stoichiometric ratio 1:1, in agreement with thermal analysis results.

This outcome confirmed that different end crystallization temperature did not influence either the crystalline phase or the resulting Ketoprofen:Lysine stoichiometric ratio in solid state. Accordingly, Ketoprofen Lysine co-crystal Form 1 and Ketoprofen Lysine co-crystal Form 4 appears as polymorphs of the same co-crystal.

Furthermore, the present Ketoprofen Lysine co-crystal Form 4 clearly differs from the previous Ketoprofen Lysine Salt as confirmed by XRPD, $^{13}$C-ss-NMR, FT-IR, FT-Raman and DSC analyses.

Regarding the intrinsic dissolution rate (IDR), the release of Ketoprofen at pH 1.2 (SGF) from Ketoprofen Lysine co-crystal Form 4 was faster than the release form Ketoprofen Lysine co-crystal Form 1 (1.16 vs 0.94 mg·cm-2·min-1). At pH 6.5 (salivary pH) this difference was more marked (5.16 vs 4.23).

The solubility of Ketoprofen Lysine co-crystal Form 4 was similar to that of Ketoprofen Lysine co-crystal Form 1.

Regarding the particle size distribution, the present Ketoprofen Lysine co-crystal Form 4 interestingly shows smaller particle size than Ketoprofen Lysine Salt predictive of improved applications particularly in oral dosage formulations.

Finally, in the Electronic Tongue test, Ketoprofen Lysine co-crystal Form 4 resulted to have a better taste (i.e. close to sweet) compared to Ketoprofen Lysine co-crystal Form 1 taste.

The invention claimed is:

1. A co-crystal of Ketoprofen Lysine (Form 4) characterized in that the co-crystal has an X-ray diffraction pattern with characteristic peaks at 13.6; 16.0; 16.5; 17.3; 19.1; 19.4; 20.5; 21.8; 22.9; 23.5; 24.9; 25.9; 27.6° 2theta±0.20 degrees.

2. The co-crystal according to claim 1, characterized by having the following X-ray diffraction pattern characteristic peaks: 3.8; 7.6; 11.4; 11.6; 13.4; 13.6; 14.6; 15.2; 15.5; 15.9; 16.0; 16.5; 17.3; 18.8; 18.9; 19.0; 19.1; 19.2; 19.3; 19.4; 20.5; 20.6; 21.7; 21.8; 21.9; 22.0; 22.1; 22.2; 22.3; 22.4; 22.9; 23.4; 23.5; 23.5; 24.1; 24.2; 24.4; 24.5; 24.6; 24.7; 24.9; 25.0; 25.3; 25.4; 25.5; 25.9; 26.0; 26.5; 26.5; 26.8; 26.9; 27.0; 27.1; 27.4; 27.6; 27.7; 27.8; 28.2; 28.3; 28.4; 29.0; 29.2; 29.3; 29.5; 29.9; 30.0; 30.7° 2theta±0.20 degrees.

3. The co-crystal according to claim 1, wherein the molecular ratio between Ketoprofen and Lysine is 1:1.

4. The co-crystal according to claim 1, characterized in that the co-crystal has an endothermic peak at 158.8° C.±2° C. measured by differential scanning calorimetry (DSC).

5. The co-crystal according to claim 1, wherein the co-crystal has a particle size distribution wherein D90 is lower than 220 µm.

6. The co-crystal according to claim 1, wherein the co-crystal has a particle size distribution wherein D90 is lower than 150 µm.

7. A pharmaceutical composition comprising the co-crystal according to claim 1 and at least one physiologically acceptable excipient.

8. The pharmaceutical composition according to claim 7, wherein the excipients are selected from the group consisting of: povidone, colloidal silica, hydroxypropylmethylcellulose, copolymer of butyl methacrylate, dimethylaminoethyl methacrylate and methyl methacrylate, sodium dodecyl sulfate, stearic acid, magnesium stearate, aspartame, mannitol, xylitol, talc, and flavors.

9. The pharmaceutical composition according to claim 7, wherein the pharmaceutical composition is in solid granulate form.

10. A pharmaceutical composition comprising the co-crystal according to claim 1 in combination with at least another pharmaceutically active ingredient.

11. A method of treating a condition selected from pain and inflammation diseases in a subject in need thereof, comprising administration of the co-crystal according to claim 1, alone or in combination with one or more physiologically acceptable excipients.

12. The method according to claim 11, wherein the pain is selected from the group consisting of: acute pain, headache, toothache, menstrual pain, muscle pain, and osteoarticular pain.

13. The method according to claim 11, wherein the inflammation diseases is rheumatitis disease.

14. A process for the preparation of the co-crystal according to claim 1, wherein the process comprises the following steps:

a) preparing a non-saturated solution of Ketoprofen in a solvent selected from 2-methyl-1-propanol and ethyl acetate;
    b) mixing the non-saturated solution of Ketoprofen with solid lysine to provide an admixture.

15. The process according to claim 14, wherein the non-saturated solution of step a) has a concentration of Ketoprofen from 50 to 150 mg/ml.

16. The process according to claim 15, wherein the non-saturated solution of step a) has a concentration of Ketoprofen from 70 to 120 mg/ml.

17. The process according to claim 15, wherein the non-saturated solution of step a) has a concentration of Ketoprofen from 80 to 100 mg/ml.

18. The process according to claim 14, wherein the molar ratio Ketoprofen:Lysine is from 1.5:1 to 3.5:1.

19. The process according to claim 18, wherein the molar ratio Ketoprofen:Lysine is from 2:1 to 3:1.

20. The process according to claim 14, wherein the admixture obtained in step b) has a water content from 0.3 to 1.5% (v/v).

21. The process according to claim 20, wherein the admixture obtained in step b) has a water content from 0.8% to 1.1% (v/v).

22. The process according to claim 14, wherein the solvent of step a) is 2-methyl-1-propanol.

* * * * *